(12) United States Patent
Szymanski

(10) Patent No.: US 10,660,469 B2
(45) Date of Patent: May 26, 2020

(54) COOKING APPLIANCE AND METHOD OF COOKING A PACKAGED FOOD PRODUCT

(71) Applicant: Marek Szymanski, Warringah Mall (AU)

(72) Inventor: Marek Szymanski, Warringah Mall (AU)

( * ) Notice: Subject to any disclaimer, the term of this patent is extended or adjusted under 35 U.S.C. 154(b) by 63 days.

(21) Appl. No.: 15/304,604

(22) PCT Filed: Apr. 17, 2015

(86) PCT No.: PCT/AU2015/000236
§ 371 (c)(1),
(2) Date: Oct. 17, 2016

(87) PCT Pub. No.: WO2015/157811
PCT Pub. Date: Oct. 22, 2015

(65) Prior Publication Data
US 2017/0042376 A1 Feb. 16, 2017

(30) Foreign Application Priority Data

Apr. 17, 2014 (AU) .................................. 2014901422
Jan. 29, 2015 (AU) .................................. 2015900253

(51) Int. Cl.
*A47J 37/06* (2006.01)
*A21B 5/02* (2006.01)

(52) U.S. Cl.
CPC ............. *A47J 37/0611* (2013.01); *A21B 5/02* (2013.01); *A47J 2037/0617* (2013.01)

(58) Field of Classification Search
None
See application file for complete search history.

(56) References Cited

U.S. PATENT DOCUMENTS

| | | | | |
|---|---|---|---|---|
| 3,776,124 A * | 12/1973 | Morley | ................ | A47J 37/0611 99/335 |
| 4,189,632 A * | 2/1980 | Swanson | ............. | A47J 37/0623 126/191 |
| 4,601,237 A * | 7/1986 | Harter | ................... | A47J 37/0611 99/349 |
| 4,987,827 A * | 1/1991 | Marquez | ............... | A47J 37/0611 99/331 |
| 5,531,155 A * | 7/1996 | Pellicane | .............. | A47J 37/0611 99/349 |
| 5,716,657 A * | 2/1998 | Liebermann | .............. | A23L 3/10 426/232 |
| 5,746,118 A * | 5/1998 | Brunner | .................. | F24C 15/16 126/41 R |
| 5,802,958 A * | 9/1998 | Hermansson | ........ | A47J 37/0611 99/349 |
| 6,043,462 A * | 3/2000 | Stedron | ................... | A47B 77/08 126/211 |
| 2004/0065658 A1* | 4/2004 | Damiano | ............ | A47J 36/2483 219/524 |
| 2005/0039611 A1* | 2/2005 | Nett | ..................... | A47J 37/0704 99/450 |

(Continued)

*Primary Examiner* — Ibrahime A Abraham
*Assistant Examiner* — Gyounghyun Bae
(74) *Attorney, Agent, or Firm* — Craft Chu PLLC; Andrew W. Chu

(57) ABSTRACT

An appliance cooks packaged food items, such as making pancakes, crepes, flapjacks and the like. There is a method of cooking the packaged food items.

8 Claims, 24 Drawing Sheets

(56) References Cited

U.S. PATENT DOCUMENTS

| | | | |
|---|---|---|---|
| 2005/0279222 A1 | 12/2005 | Nevarez | |
| 2007/0017384 A1* | 1/2007 | Serra | A47J 37/0611 99/372 |
| 2011/0297010 A1* | 12/2011 | Wilson | A47J 37/0629 99/378 |
| 2012/0148713 A1 | 6/2012 | Owensby | |
| 2012/0288596 A1* | 11/2012 | Holdo Baggott | A47J 37/0704 426/235 |
| 2014/0263285 A1* | 9/2014 | Tippmann | A47J 37/0611 219/620 |
| 2015/0033953 A1* | 2/2015 | Fung | A47J 37/0611 99/377 |

* cited by examiner

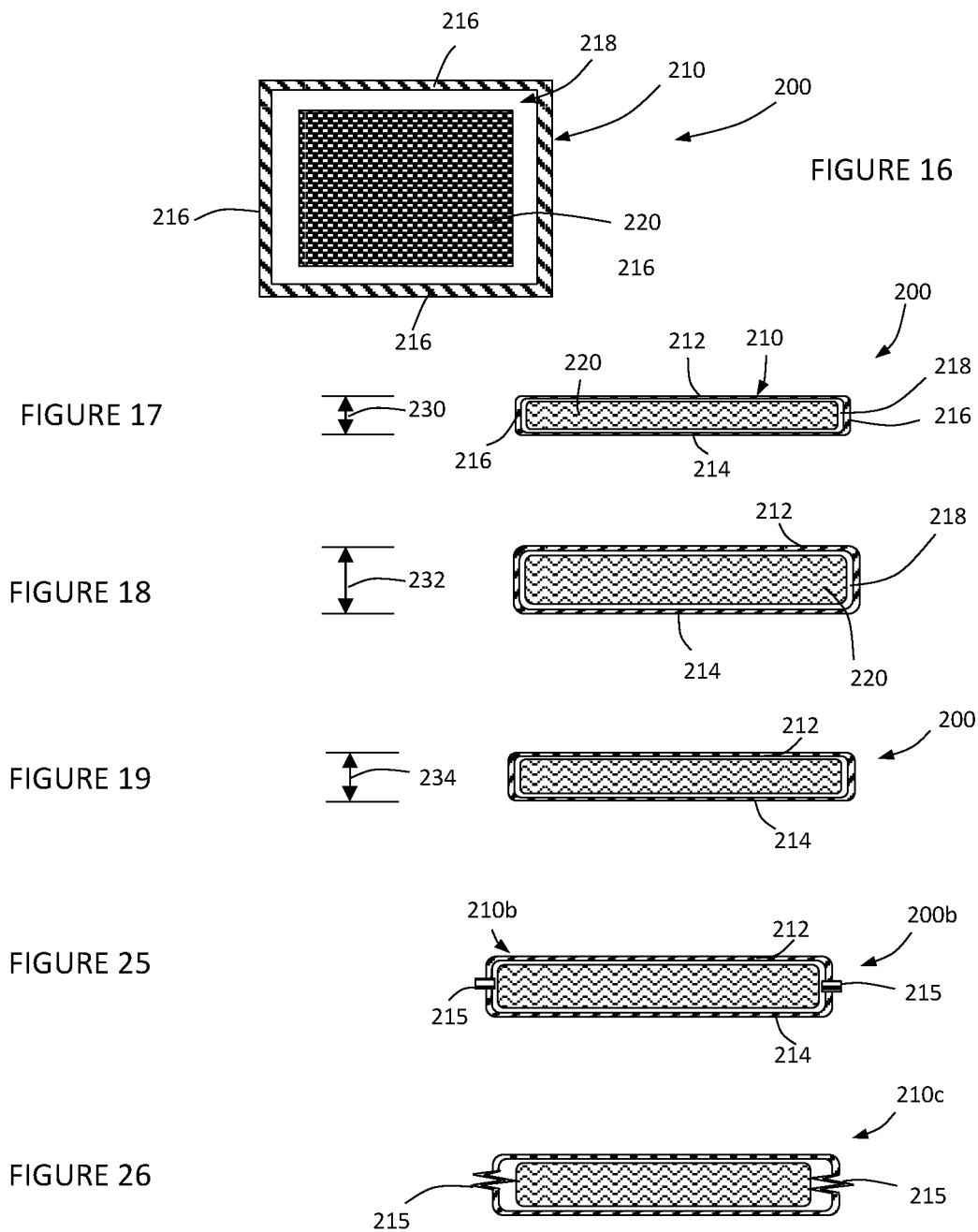

COOKING APPLIANCE AND METHOD OF COOKING A PACKAGED FOOD PRODUCT

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a cooking appliance, a method of cooking a packaged food product, a packaged food product and package for a food product.

The invention has been developed primarily for cooking batter based food products such as cakes, crepes, pancakes and waffles, or egg based products such as quiches, omelettes and cooked eggs, and will be described hereinafter with reference to these applications. However, it will be appreciated that the invention is not limited to this particular field of use.

2. Description of Related Art Including Information Disclosed Under 37 CFR 1.97 and 37 CFR 1.98

Cooking batter based or egg based food products can often be messy, take a lot of time and require extensive cleaning. The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

BRIEF SUMMARY OF THE INVENTION

According to a first aspect, the present invention provides an appliance for cooking a food product, the appliance comprising:

at least one cooking assembly comprising first and second heatable plates movable relative to each other between:

an open configuration at which a food product can be placed between the first and second plates; and a closed configuration at which the first and second plates are moved towards a first relative distance to each other to contact respective opposing sides of the food product, wherein the first and/or second plates are movable to a greater second relative distance therebetween.

Preferably, the first and/or second plates are movable to at least one third relative distance therebetween, the at least one third relative distance being between the first and second distances.

Preferably, the at least one third relative distance comprises a predetermined minimum distance between the first and second plates.

In another aspect, the present invention provides an appliance for cooking a packaged food product, the appliance comprising:

at least one cooking assembly comprising first and second heatable plates movable relative to each other between:

an open configuration at which the packaged food product can be placed between the first and second plates; and a closed configuration at which the first and second plates are moved towards a first relative distance between the plates to contact respective opposing sides of the packaged food product, wherein gases produced within the package during the cooking process expands the package and moves the plates to a second larger distance therebetween, and release of the gases from the package allows the plates to move back closer to each other to a third relative distance between the first and second distances.

Preferably, the appliance comprises a plurality of the cooking assemblies. Preferably, each cooking assembly is individually actuatable.

Preferably, the first, second and/or the third relative distances are adjustable.

Preferably, the second relative distance can be limited to a predetermined maximum second distance.

Preferably, the plates are adapted to remain in contact with the food product up to the third relative distance.

Preferably, the plates are adapted to provide a compressive force to the food product up to the third relative distance.

In one embodiment, the plates are oriented generally vertically in the closed configuration.

In another embodiment, the plates are oriented generally horizontally in the closed configuration.

In another embodiment, the plates are oriented at an inclined angle in the closed configuration.

In one embodiment, the first and second plates are both movable between the open and closed configurations.

In another embodiment, the first plate remains substantially stationary and the second plate is movable relative to the first plate between the open and closed configurations.

Preferably, each cooking assembly is adapted to eject the food product from between the plates after a predetermined cooking time.

Preferably, the appliance comprises a base body and a lid body, wherein the first plate is mounted to the lid body and the second plate is mounted to the base body.

Preferably, the lid body is pivotable relative to the base body between an open configuration and a closed configuration.

Preferably, the base body comprises a bottom wall, side walls, a rear wall and a front wall which together define a lower internal space, wherein the second plate is disposed within the lower internal space.

Preferably, the lid body comprises a top wall, side wall, a rear wall and a front wall which together define an upper internal space, wherein the first plate is disposed within the upper internal space.

Preferably, the second plate comprises a heatable top surface which is recessed from a peripheral border.

Preferably, the second plate is pivotably mounted so as to be movable between a generally horizontal position and a tilted position.

Preferably, the appliance further comprises a tilting assembly operatively extending between the first and second plates, wherein
  when the first and second plates are in the closed configuration, the tilting assembly positions the second plate in its horizontal position,
  when the first and second plates are moved to the open configuration, the tilting assembly lifts a rear portion of the second plate to move the second plate to its tilted position; and
  when the first and second plates are moved to the closed configuration, the tilting assembly returns the second plate to its horizontal position.

Preferably, the first and second plates are resiliently biased to the open configuration.

Preferably, the appliance further comprises a stopper for retaining the plates in the closed configuration.

Preferably, the stopper is connected to a cooking timer which releases the first and second plates at the end of a cooking period.

Preferably, the first plate is mounted via a mounting mechanism for movement in a substantially perpendicular direction relative to the second plate in the closed configuration.

In one embodiment, the first plate is mounted to a lid body and the mounting mechanism comprises, on each side of the first plate, a pair of spaced parallel arms pivotably mounted to respective portions of the first plate and to respective portions of the lid body.

In another embodiment, the first plate is mounted to a lid body and the mounting mechanism comprises spaced posts mounted to the lid body and extending generally perpendicularly to first plate, the first plate comprising formations respectively engaging the posts to allow the first plate to be movable along the posts.

Preferably, the first and second plates are substantially parallel to each other in the closed configuration.

In another embodiment, the first and second plates are at an acute angle to each other in the closed configuration.

Preferably, the appliance further comprises a retaining assembly for providing a predetermined minimum distance between the first and second plates in the third relative distance therebetween.

Preferably, the retaining assembly comprises a pivotable retaining arm having a retaining leg biased to a position of engagement with the first plate.

Preferably, the retaining assembly comprises a release means for moving the retaining leg away from its engagement position when the first and second plates move to their closed configuration.

Preferably, the first and second plates have a maximum length and width of about 20 cm each.

Preferably, the first and second plates comprise a flat heatable surface.

In another embodiment, at least one of the first and second plates comprises a textured heatable surface.

In another aspect, the present invention provides a packaged food product comprising an outer package and a food product disposed within the package, wherein the package is heat resistant and allows the food product to be cooked via heated plate contact with the package.

Preferably, the package comprises first and second panels sealed to each other along their peripheral portions to form an internal chamber therewithin, the food product being disposed within the internal chamber.

In one embodiment, at least one of the first and second panels is stretchable or expandable.

Alternatively, the package comprises first and second spaced panels and at least one side wall connecting peripheral portions of the first and second panels to form an internal chamber therewithin, the food product being disposed within the internal chamber.

In one embodiment, the at least one side wall is stretchable or expandable.

In another embodiment, the at least one side wall comprises a concertina structure.

Preferably, the food product is at least one of a batter based food product for making a cake, a crepe, a pancake or a waffle, or an egg based product for making a quiche an omelette or cooked egg.

In another embodiment, at least one of the first and second panels is shaped to provide a contoured texture to the food product.

Preferably, during the cooking process, the package allows the food product to expand and/or produce gases within the internal chamber.

In one embodiment, the package minimises the release of the gases from the internal chamber.

In another embodiment, the package releases the gases from the internal chamber after a predetermined pressure within the internal chamber is reached.

Preferably, the predetermined pressure is about 1.5 bar.

Preferably, the package comprises release means for releasing the gases when the predetermined pressure is reached.

Preferably, the release means comprises at least one seal which opens at the predetermined pressure.

In another embodiment, the package is adapted to constantly release the gases from the internal chamber at a slow predetermined rate.

Preferably, the release means comprises at least one aperture of predetermined diameter formed in the package.

Preferably, the panels comprise peel tabs for peeling the panels from each other.

In another aspect, the present invention provides a method of cooking a packaged food product, the method comprising:
  disposing the packaged food product between first and second heatable plates in a first relative distance between the plates;
  allowing gases to be produced within the package during the cooking process which expands the package and moves the plates to a second relative distance therebetween; and allowing release of the gases from the package and allowing the plates to move back towards each other up to a minimum third relative distance therebetween.

In another aspect, the present invention provides a package for a food product, the package comprising first and second spaced panels connected at their peripheral portions to form an internal chamber therewithin, wherein the package is heat resistant and allows the food product to be cooked via heated plate contact with the package.

In another aspect, the present invention provides a package for a food product, the package comprising first and second spaced panels and at least one side wall connecting peripheral portions of the first and second panels to form an internal chamber therewithin, wherein the at least one side wall is stretchable or expandable.

In one embodiment, the at least one side wall comprises a concertina structure. Preferably, the internal chamber is fully sealed.

In another aspect, the present invention provides a package for a food product, the package comprising first and second panels joined to each other along their peripheral portions to form an internal chamber therewithin, wherein the first and second panels comprise non-stick material.

Preferably, the first and second panels comprise heat resistant, food approved material.

In another aspect, the invention may be said to consist in a packaged food arrangement comprising
- an outer package comprising an upper layer of heat resistant polymer film, and a lower layer of heat resistant polymer film; and
- a food product disposed within the package, the food product comprising at least a binder and a raising agent;
- wherein the package food product is configured in a flat configuration.

In one embodiment, the packaged food product is configured in a flat configuration suitable for convenient cooking of the food product by heated plate contact on the upper layer and lower layer.

In one embodiment, the upper layer of heat resistant polymer film on the lower layer of heat resistant polymer film is composed of two separate sheets that are bonded to each other at least around their periphery.

In one embodiment, the package food arrangement is substantially planar.

In one embodiment, the packaged food arrangement defines an upper major face and a lower major face, and peripheral edges.

In one embodiment, the width of the packaged food arrangement between its major faces is between 0.5 millimetres and 50 mm.

In one embodiment, the width of the packages food arrangement between its major faces is between 2 mm and 20 mm.

In one embodiment, the width of the packaged food arrangement between its major faces is about 10 mm.

In one embodiment, the package comprises a first panel and a second panel sealed to each other along their periphery to form an internal chamber therewithin, the food product being disposed within the internal chamber.

In one embodiment, the upper layer of heat resistant polymer film and the lower layer of heat resistant polymer film is composed of a single sheet.

In one embodiment, wherein at least one of the first panel and second panel is one or more selected from stretchable and expandable.

In one embodiment, the package comprises first and second spaced panels and at least one side wall connecting peripheral portions of the first and second panels to form an internal chamber therewithin, the food product being disposed within the internal chamber.

In one embodiment, the at least one side wall is stretchable or expandable.

In one embodiment, the at least one side wall comprises one or more selected from
- a concertina formation,
- a pleat formation, and
- a telescoping formation.

In one embodiment, the food product comprises at least a binder and a raising agent.

In one embodiment, the food product comprises at least a binder, a sweetener, fat and a raising agent.

In one embodiment, the food product is at least one selected from a batter based food product for making a cake, a crepe, a pancake, a crumpet, a flapjack a waffle, or an egg based product for making a quiche, an omelette or cooked egg.

In one embodiment, at least one of the first and second panels is shaped to provide a contoured texture to the food product.

In one embodiment, during the cooking process, the package allows the food product to expand and/or produce gases within the internal chamber.

In one embodiment, the package is configured to minimise the release of the gases from the internal chamber.

In one embodiment, the package is configured to release the gases from the internal chamber after one or more selected from a predetermined pressure and a predetermined volume within the internal chamber is reached In one embodiment, the predetermined pressure is about 1.5 bar.

In one embodiment, the package comprises release means for releasing the gases when said one or more selected from a predetermined pressure and a predetermined volume is reached.

In one embodiment, the release means comprises one or more selected from at least one seal and at least one perforation which opens at the predetermined pressure.

In one embodiment, the package is adapted to constantly release the gases from the internal chamber at a slow predetermined rate.

In one embodiment, the release means comprises at least one aperture of predetermined diameter formed in the package.

In one embodiment, the panels comprise peel tabs for peeling the panels from each other.

In one embodiment, the food product is freezable.

In one embodiment, the upper layer is one or more selected from
- bonded to the lower layer;
- heat sealed to the lower layer; and
- ultrasonically bonded to the lower layer.

In another aspect, the invention may be said to consist in a method of cooking a packaged food product, the method comprising:
- disposing the packaged food product between a first heatable plate and a second heatable plate, with the first heatable plate and the second heatable plate being disposed at a first relative distance from each other;
- allowing gases to be produced within the package during the cooking process which expands the package and moves the plates to a second relative distance therebetween; and
- allowing release of the gases from the package and allowing the plates to move back towards each other up to a minimum third relative distance therebetween.

In another aspect, the invention may be said to consist in a packaged food arrangement, the package comprising
- a first panel and a second panel; and
- at least one side wall connecting peripheral portions of the first panel and second panel to form an internal chamber therewithin,
- a food product located within the internal chamber, the food product comprising a binder and a raising agent;

wherein the at least one side wall is stretchable or expandable.

In one embodiment, the at least one side wall comprises one or more selected from concertina formation, a pleat formation and a telescoping formation.

In another aspect, the invention may be said to consist in a packaged food arrangement, the package comprising
a first panel and a second panel; and
at least one side wall connecting peripheral portions of the first panel and second panel to form an internal chamber therewithin,
a food product located within the internal chamber, the food product comprising at least a binder and a raising agent;
wherein the at least one side wall is stretchable or expandable.

In one embodiment, the at least one side wall comprises one or more selected from
a concertina formation,
a pleat formation and
a telescoping formation.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention are also disclosed.

BRIEF DESCRIPTION OF THE SEVERAL VIEWS OF THE DRAWINGS

Notwithstanding any other forms which may fall within the scope of the present invention, preferred embodiments of the present invention will now be described, by way of examples only, with reference to the accompanying drawings.

FIG. 16 is a schematic front view of a packaged batter based food product according to a preferred embodiment of the present invention.

FIG. 17 is a schematic side cross-section view of the packaged batter based food product of FIG. 16 in the first stage of the cooking process.

FIG. 18 is a schematic side cross-section view of the packaged batter based food product of FIG. 16 in the second stage of the cooking process.

FIG. 19 is a schematic side cross-section view of the packaged batter based food product of FIG. 16 in the third stage of the cooking process.

FIG. 25 is a schematic side cross-section view of a first alternative package for a food product.

FIG. 26 is a schematic side cross-section view of a second alternative package for a food product.

DETAILED DESCRIPTION OF THE INVENTION

Appliance

Figure 1:
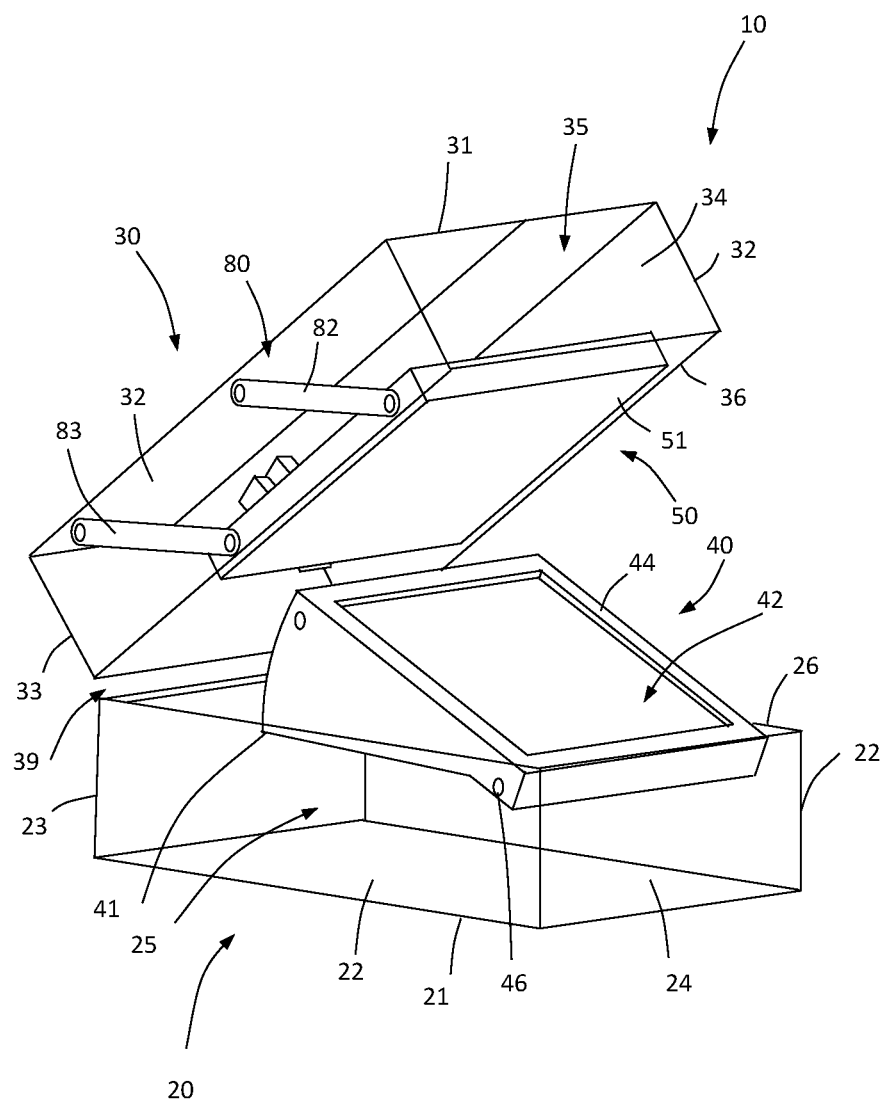
FIG. 1 is a schematic front perspective view of a cooking appliance in accordance with a preferred embodiment of the present invention in the open configuration.

It should be noted in the following description that like or the same reference numerals in different embodiments denote the same or similar features.

FIGS. 1 to 9 show a cooking appliance 10 in accordance with a preferred embodiment of the present invention. The cooking appliance 10 will be described with reference to cooking a packaged food product or packaged food arrangement. However, the cooking appliance 10 can also be used for cooking unpackaged food products.

Referring initially to FIGS. 1 to 6, the cooking appliance 10 comprises a base body 20 and a lid body 30.

The base body 20 comprises a bottom wall 21, side walls 22, a rear wall 23 and a front wall 24. The walls 21 to 24 together define a base internal space 25 and a peripheral base upper edge 26 of the base body 20. A pivotable lower plate 40 is disposed within the base internal space 25 as further described below.

The lid body 30 is similarly formed as the base body 20 includes a top wall 31, side wall 32, rear wall 33 and a front wall 34. The walls 31 to 34 also together define a lid internal space 35 and a peripheral lid lower edge 36 of the lid body 30. A movable upper plate 50 is disposed within the lid internal space 35 as further described below.

The lid body 30 is pivotably mounted to the base body 20 via a hinge 39 extending along adjacent edge portions of the rear walls 23 and 33. The lid body 30 is pivotable relative to the base body 20 between an open configuration and a closed consideration. Movement of the lid body 30 can be performed manually, at which the lid body 30 preferably includes a handle, or automatically via motor control.

In the open configuration, the lid body 30 is generally moved away from the base body 20 thus exposing the lower plate 40 and the upper plate 50. In the closed configuration, the base upper edge 26 and the lid lower edge 36 abut each other, with the side walls 22 and 32, rear walls 33 and 23 and front walls 24 and 34 aligned respectively. Thus, in the open configuration, the lower plate 40 and the upper plate 50 are disposed away from each other and a food item can be disposed or removed from therebetween, and in the closed configuration, the lower plate 40 and the upper plate 50 are adjacent each other for cooking the food item disposed therebetween.

The lower plate 40 comprises a body 41 with a generally planar heatable top surface 42. The top surface 42 is slightly recessed from a peripheral border 44 by a distance of 3 to 10 mm. The lower plate 40 is pivotably attached at a front pivot portion 46 thereof to the side walls 22.

Figure 7:
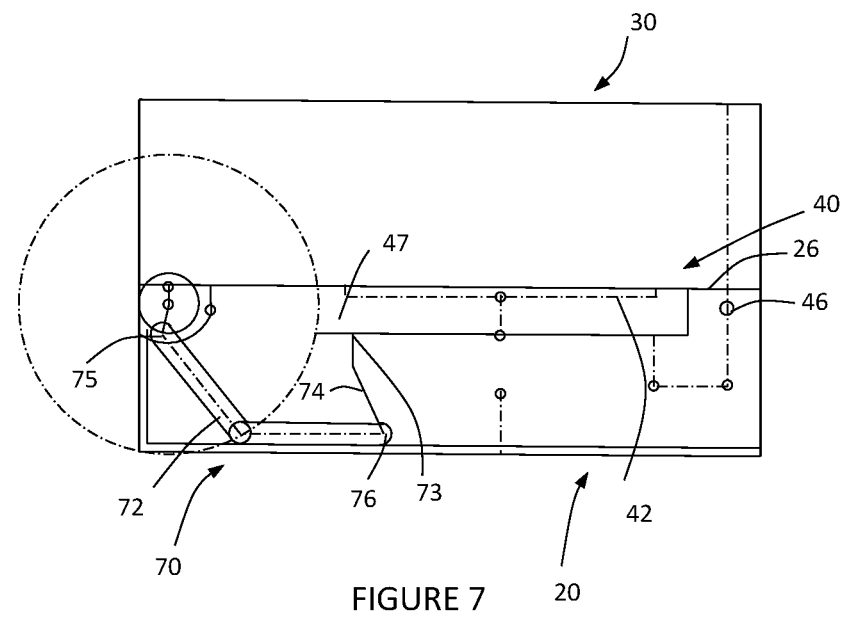
FIG. 7 is a schematic side cross-section view of the cooking appliance of FIG. 1 in the closed configuration showing the lower plate tilting assembly in the horizontal position of the lower plate.
Figure 8:
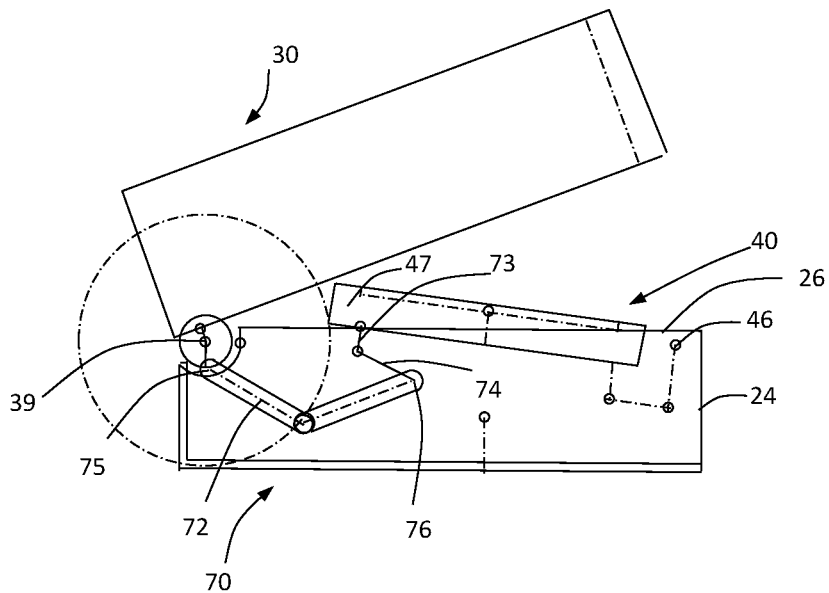
FIG. 8 is a schematic side cross-section view similar to FIG. 7 in the initial stage of tilting the lower plate.
Figure 9:
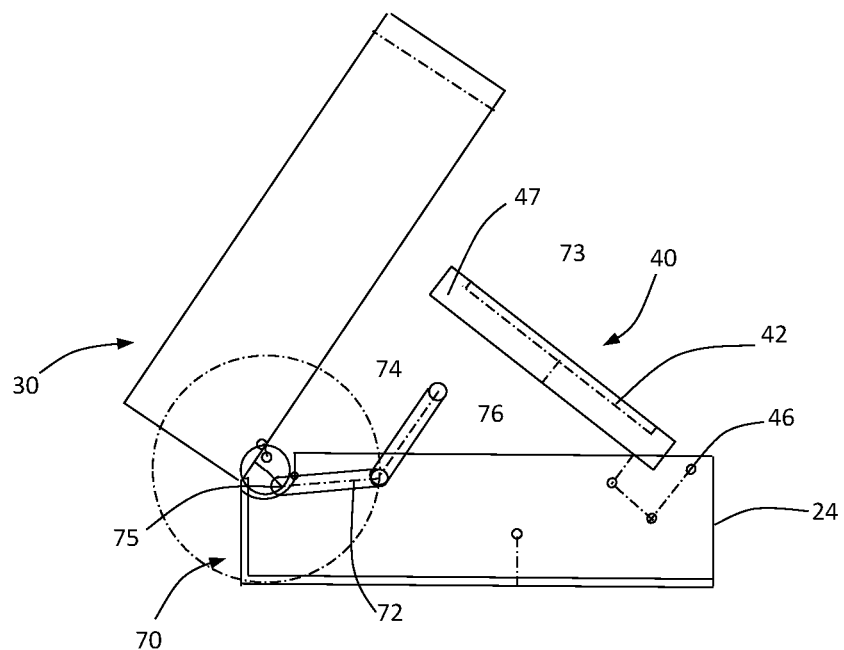
FIG. 9 is a schematic side cross-section view similar to FIG. 7 in the final stage of tilting the lower plate.

Referring to FIGS. 7 to 9, a tilting assembly 70 extends between a rear portion of the lid body 30 and a rear portion 47 of the lower plate 40. The tilting assembly 70 comprises a bent rigid arm 72 attached to the lid body 30, a post 73 extending downwardly from the lower plate 40, and a link 74. The arm 72 comprises a first end 75 attached to the lid body 30 and a second distal end 76. The link 74 is pivotally attached to the second end 76 and also pivotally attached to the post 73.

When the lid body 30 is in the closed configuration (FIG. 7), the tilting assembly 70 positions the lower plate 40 at its horizontal position, at which the top surface 42 is substantially parallel and adjacent the base upper edge 26. When the lid body 30 is pivoted from the closed configuration to the open configuration, the tilting assembly 70 lifts the rear portion 47 above the base upper edge 26 (FIG. 8), until the lower plate 40 reaches its tilted position (FIG. 9) where the top surface 42 is at a downward angle generally extending toward the front wall 24. The lower plate 40 in this tilted position is presented for placing a packaged food product or packaged food arrangement thereon or removing/sliding the packaged food product therefrom. When the lid body 30 is pivoted from the open configuration to the closed configuration, the tilting assembly 70 returns the lower plate 40 to its horizontal position.

It is apparent that other embodiments of the tilting assembly 70 are possible, including those having lifting posts, gears or cams. Referring back to FIGS. 1 to 6, either one or both of the lid body 30 and the lower plate 40 is resiliently biased to the open configuration/tilted position by suitable means such as torsion springs 39A, 46A at the front pivot portion 46 and the hinge 39. The base body 20 includes a tab stopper 28 which engages a rear protrusion 48 of the lower plate 40 to retain the lower plate 40 in its horizontal position (and the lid body 30 in its closed configuration) for a selected cooking period. The tab stopper 28 can be connected to a cooking timer which releases the lower plate 40 at the end of the cooking period thus allowing the lower plate 40 to move to its tilted position. The tab stopper 28 can be spring loaded, and can comprise a solenoid for releasing the stopper as required.

The upper plate 50 comprises a heatable lower surface 51, and is mounted to the lid body 30 via a mounting means or mounting mechanism 80 for movement in a substantially perpendicular (vertical) direction relative to the lower plate 40 in the closed configuration.

The mounting mechanism 80 comprises, on each side of the upper plate 50, a pair of parallel front and rear arms 82 and 83. The front arms 82 are pivotably mounted to a front pivot portion 54 of the upper plate 50 and to an upper portion 37 of the side wall 32, about halfway between the front wall 34 and the rear wall 33. The rear arms 83 are pivotably mounted to a rear pivot portion 56 of the upper plate 50 and to an upper portion 38 of the side wall 32, adjacent the rear wall 33. The arms 82 and 83 are parallel to each other and allow the upper plate 50 to move in a generally vertical direction relative to the lid lower edge 36 and minimises lateral movement.

The lid body 30 comprises a retaining assembly 90 which retains the upper plate 50 at a predetermined distance from the lower plate 40 in the final stage of the cooking process according to a preferred embodiment of the present invention.

In the first stage of the cooking process, the lower plate 40 and the upper plate 50 are initially adjacent and substantially abutting each other (FIG. 3) with the packaged food product to be cooked being disposed therebetween (first position of the upper plate 50). In the second stage, gases and/or steam are produced within the packaged food product which expands the packaging and lifts the upper plate 50 from the lower plate 40 (FIG. 4) (second position of the upper plate 50). In the third stage, the gases from within the packaged food product are released which allows the upper plate 50 to move back towards the lower plate [151] 40 (FIG. 5) (third position of the upper plate 50). The retaining assembly 90 retains a minimum distance between the upper and lower plates 50 and 40 during this third stage.

The second position of the upper plate 50 depends on the expansion of the food product. Depending on the release of the gases from the package, the third position of the upper plate 50 may be at the minimum distance provided by the retaining assembly 90 or slightly above this minimum distance.

The retaining assembly 90 comprises an angle formation member 91, an actuation arm 92 and a retaining arm 93. The angle formation member 91 is mounted to the base body 20 and extends upwardly from the base upper edge 26 thereof. The angle formation member 91 comprises an inclined angle surface.

The actuation arm 92 and the retaining arm 93 are both mounted to a pivot block 95 extending from the lid body 30, about respective pivot points 96 and 97. The actuation arm 92 comprises an angled lower end 101 and an upper stub 102 which are disposed on opposite sides of the pivot point 96. The retaining arm 93 comprises an upper portion 103 and a lower retaining leg 104 which are disposed on opposite sides of the pivot point 97.

The retaining leg 104 is biased to a position of engagement with the lower surface 51 or a rear edge 52 of the upper plate 50 (FIG. 5), for example by the retaining arm 93 having torsion springs about the pivot point 97 as indicated by arrow 106. The upper stub 102 is biased to a position of engagement with the upper portion 103 (FIG. 6), for example by the actuation arm 92 having torsion springs about the pivot point 96 as indicated by arrow 107. The torsion force acting on the actuation arm 92 is greater than the torsion force acting on the retaining arm 93.

Figure 2:
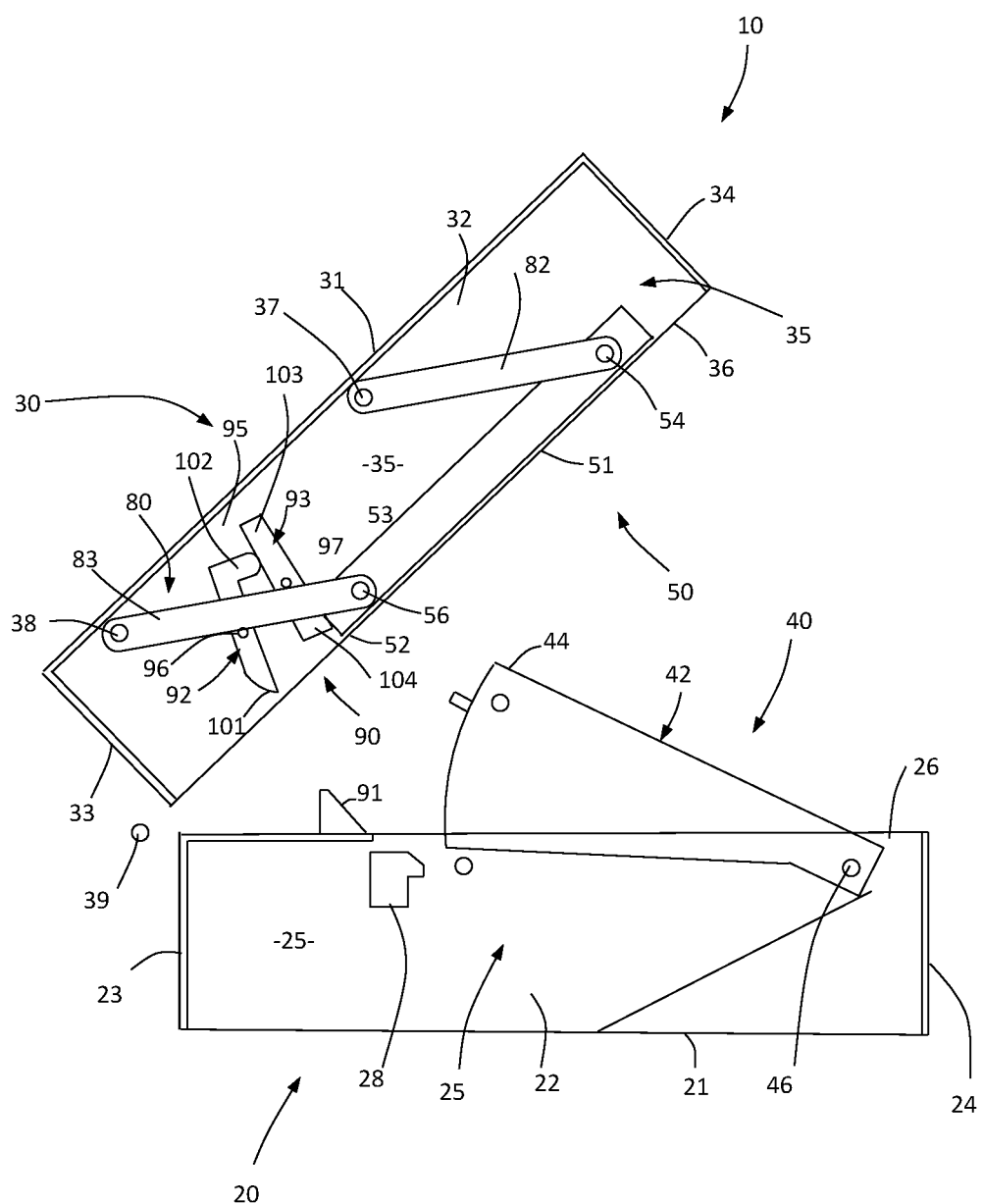
FIG. 2 is a schematic side cross-section view of the cooking appliance of FIG. 1 in the open configuration.
Figure 3:
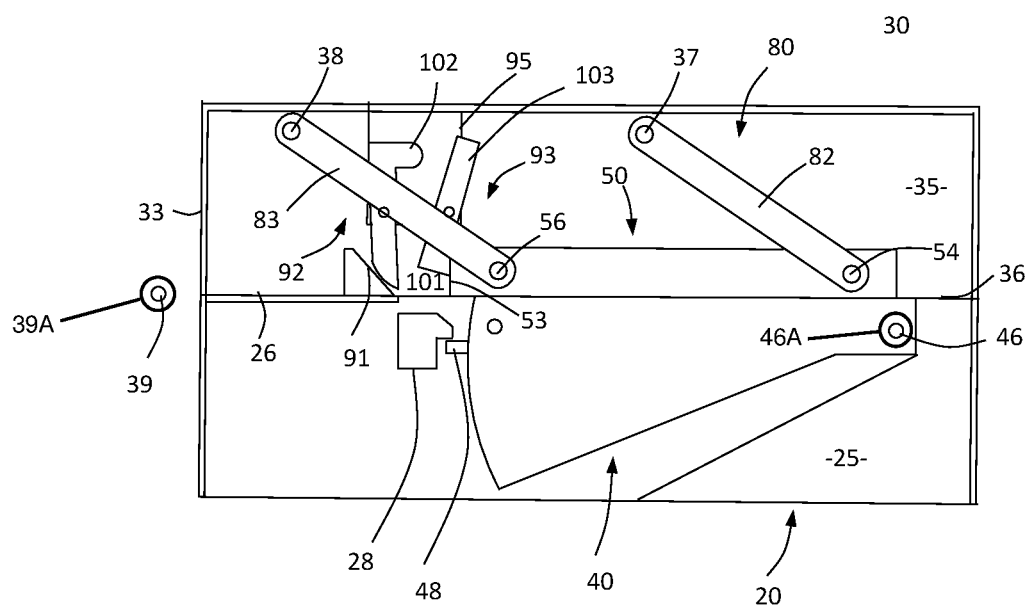
FIG. 3 is a schematic side cross-section view of the cooking appliance of FIG. 1 in the closed configuration with the cooking plates in a first relative position.
Figure 4:
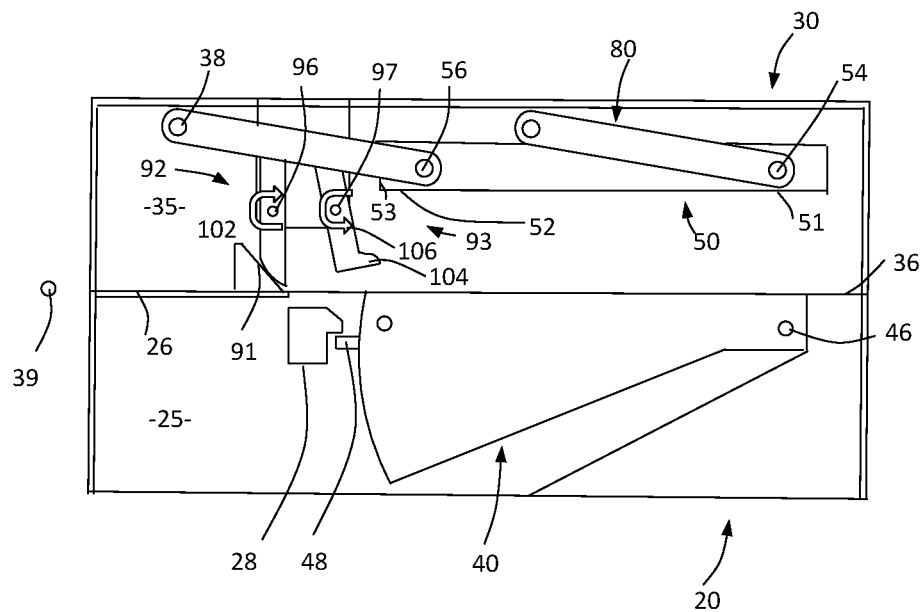
FIG. 4 is a schematic side cross-section view of the cooking appliance of FIG. 1 in the closed configuration with the cooking plates in a second relative position.

In the open configuration of the lid body 30, the upper stub 102 engages the upper portion 103 of the retaining arm 93, positioning the retaining leg 104 to a position of disengagement with the lower surface 51 or the rear edge 52 (FIG. 2). This allows the upper plate 50 to move downwardly past the retaining leg 104 for the lower surface 51 to be substantially aligned with the lid lower edge 36 (first position of the upper plate 50).

Figure 5:
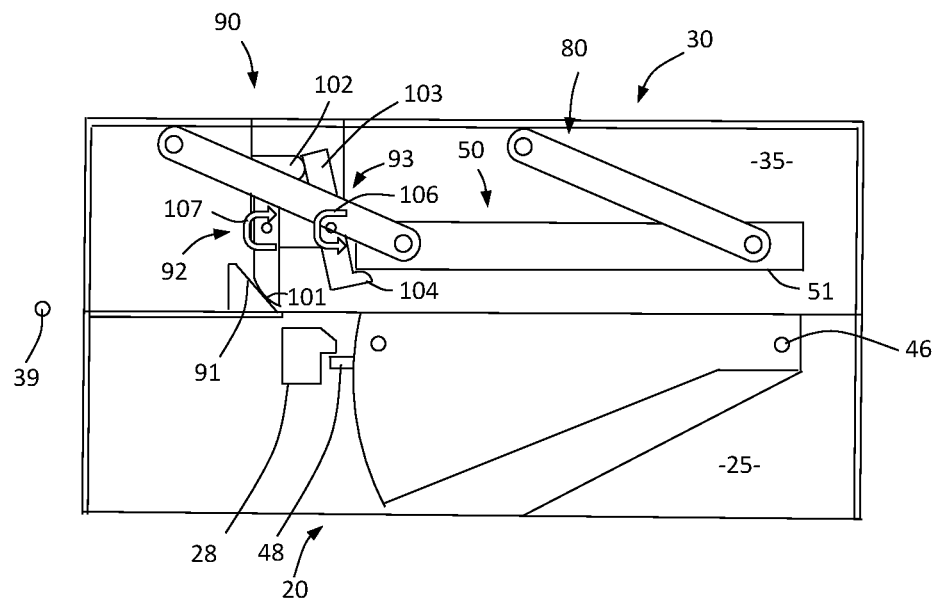
FIG. 5 is a schematic side cross-section view of the cooking appliance of FIG. 1 in the closed configuration with the cooking plates in a third relative position.

In the closed configuration of the lid body 30, the lower end 101 engages the angle formation 91, moving the upper stub 102 to a position of disengagement with the upper portion 103. This allows the retaining arm 93 to pivot to bias the retaining leg 104 toward the upper plate 50. Whilst the upper plate 50 is in its first position, the retaining leg 104 engages against a rear wall 53 of the upper plate 50. Once the upper plate 50 is lifted during use toward its second position, the retaining leg 104 is moved to its engagement position (FIG. 4), at which it can engage the lower surface 51 or the rear edge 52 when the upper plate moves to its third position (FIG. 5).

Figure 6:
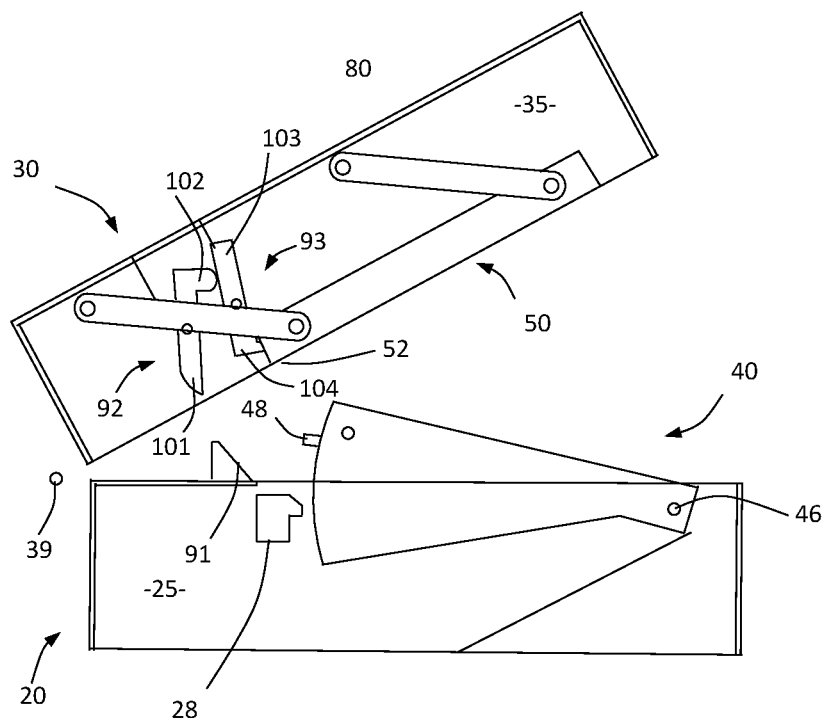
FIG. 6 is a schematic side cross-section view of the cooking appliance of FIG. 1 moving back to the open configuration.

When the food product is cooked, the lid body 30 is moved to its open configuration at which the lower end 101 disengages the angle formation 91, the upper stub 102 engages the upper portion 103 of the retaining arm 93, and the retaining leg 104 is moved to its disengagement position with the lower surface 51 or the rear edge 52 (FIG. 6). The actuation arm 92 thus acts as a release means to allow the upper plate 50 to move back to its first position.

The first, second and third positions of the upper plate 50 thus define respective first, second and third relative distances between the lower plate 40 and the upper plate 50.

It is envisaged that in alternative arrangement shown in FIGS. 32-35, one or both of the first heatable plate and the second heatable plate are be biased towards each other by springs 85 to maintain a consistent (relatively low) force on the packaged food arrangement or package food product as it cooks. It is envisaged that in such an embodiment, the first heatable plate and second heatable plate will be movable relative to each other between an open configuration in which the food product arrangement can be placed between them, and a closed configuration in which they engage opposing sides of the packaged food product (shown in FIG. 29).

When in the closed configuration, the food product 200 will undergo a cooking process illustrated in order in FIGS. 32-35.

As the packaged food product expands under pressure of the gases within the package food product, the first heatable plate and the second heatable plate will maintain a constant pressure on the package food product, while being moved apart. It is anticipated that the package food product will release the gases within it, for example by rupturing or controlled release of gases through an aperture (not shown) once the food product within is suitably cooked or baked, at which time the first heatable plate and the second heatable plate will move closer to each other again, maintaining the same force (or range of forces) on the packaged food product to ensure the browning or caramelisation of the package food product, without damaging the integrity of the food product structure.

Packaged Food Product

Figure 20:
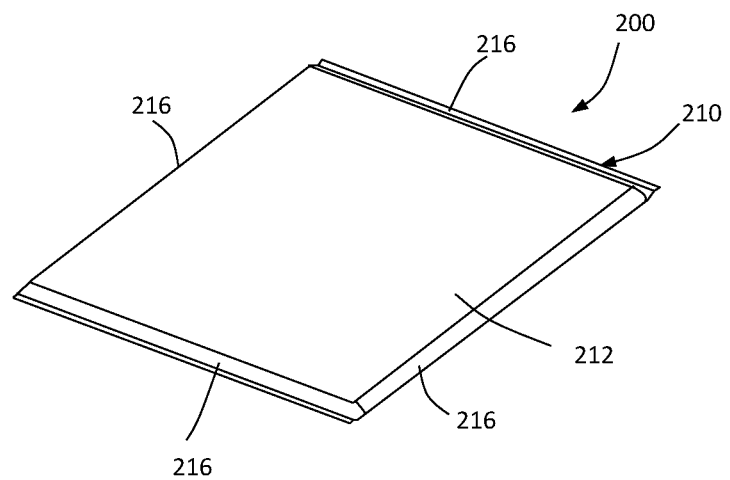
FIG. 20 is a schematic perspective view of the packaged batter based food product as shown in FIG. 17.

FIGS. 16, 17 and 20 show a packaged food arrangement, also referred to as a packaged food product 200 prior to the cooking process or in the first stage of the cooking process. The packaged food product 200 comprises an outer packaging portion in the form of an outer package 210 and a food product 220 disposed within the package 210. The package 210 is preferably composed of a heat resistant foil, such as a polyethylene terephthalate polyester film, such as that sold under the trade name Mylar by DuPont industries, and allows the food product 220 to be cooked preferably via heated plate contact with the package 210.

The package 210 generally comprises first and second panels 212 and 214 sealed to each other along their peripheral portions 216 to form a bag defining an internal chamber 218 therewithin. That the first panel 212 and second panel 214 can be heat sealed to each other or be adhered or bonded to each other by a suitable form of food grade approved adhesive, such as a neoprene reacted phenolic adhesive; or a vinyl acetate emulsion adhesive.

The package 210 can alternatively be formed from a folded elongated material and will thus have one joined edge portion with the other three edge portions 216 joined to each other to form the package 210.

The food product 220 is disposed within the internal chamber 218 and can be made from any desired mixture such as a batter based food product for making a cake, a crepe, a pancake or a waffle, or an egg based product for making a quiche, an omelette or cooked egg, or any other similar product as desired. In a preferred embodiment, it is anticipated that the food product 220 will comprise a baking mix including at least a filler, a binder and a raising agent. The term "raising agent" is defined to include aerators of any form. In a more preferred embodiment, it is anticipated that the food product will be a baking mix including at least a filler, a binder, a sweetener, fat and a raising agent.

Prior to cooking, the packaged food product 200 is generally flat (FIGS. 17 and 20) and typically stored in a refrigerator or freezer to keep the food product 220 from spoiling. In the initial stage of the cooking process, the packaged food product 200 remains in this generally flat configuration with an initial first thickness 230 and is engaged by the lower and upper plates 40 and 50 in the first position of the upper plate 50.

Figure 21:
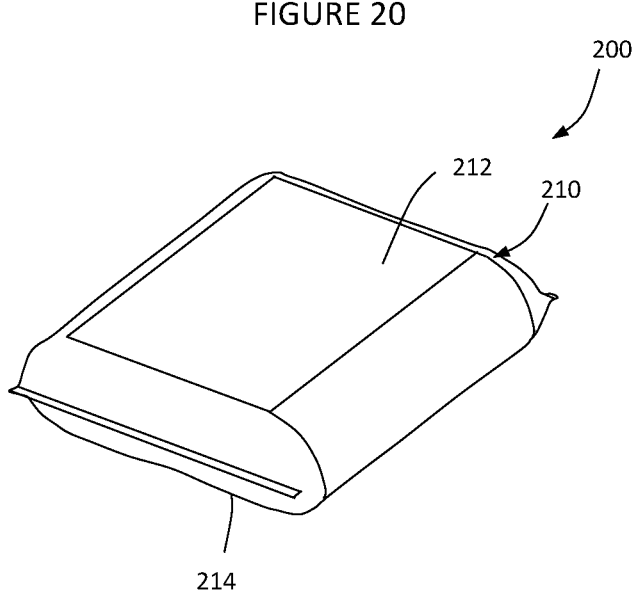
FIG. 21 is a schematic perspective view of the packaged batter based food product as shown in FIG. 18.

In the second stage of the cooking process, the food product 220 being cooked expands (FIGS. 18 and 21) and produces gases within the internal chamber 218, which moves the first panel 212 away from the second panel 214 thus expanding the package 210. It is anticipated that the gases can be produced from the aerators included in the food product 220, or by gasification of liquids such as water (for example as water vapour). The panels 212 and 214 remain generally parallel in their expanded configuration. The packaged food product 200 defines a greater second thickness 232 and lifts the upper plate 50 from the lower plate 40 to its second position.

The packaged food arrangement is preferably adapted for expanding to drive the first panel and the second panel apart from each other under pressure of the gases created during the process of cooking the food product 220. It is anticipated that the package 210 will further be adapted for rupturing at a predetermined pressure and/or volume to release the gas.

Figure 22:
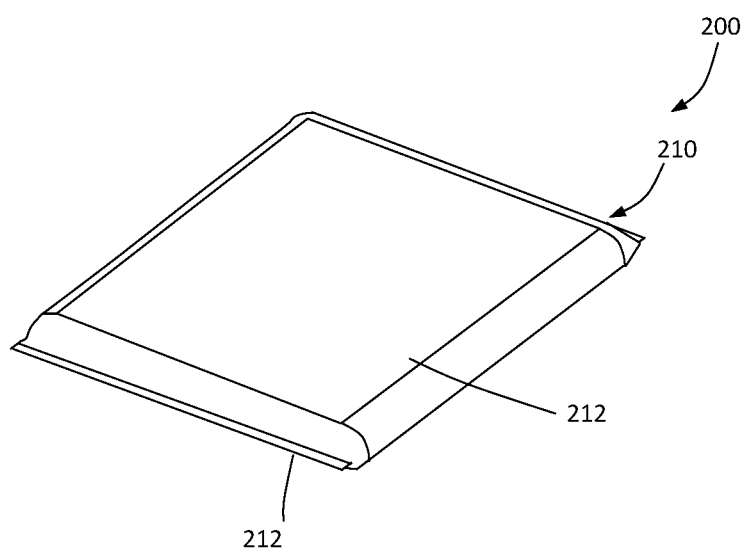
FIG. 22 is a schematic perspective view of the packaged batter based food product as shown in FIG. 19.

In the third stage of the cooking process, the gases within the internal chamber 218 are released (FIGS. 19 and 22) which allows the upper plate 50 to move back towards the lower plate 40 to its third position. The packaged food product 200 in this stage defines a third thickness 234 which is between the first and second thicknesses 230 and 232. It is important that when the upper plate moves back towards the lower plate into its third position, the cooked food product is not flattened, and the integrity of the aerated or raised food product is retained.

In this way, correct conditions for the baking of the food product are created within the internal chamber 218 of the package 210 (or foil bag), after which time the upper plate 50 moves back towards the lower plate 42 ensure a browning or caramelisation effect on both opposed sides of the food product.

Figure 27:
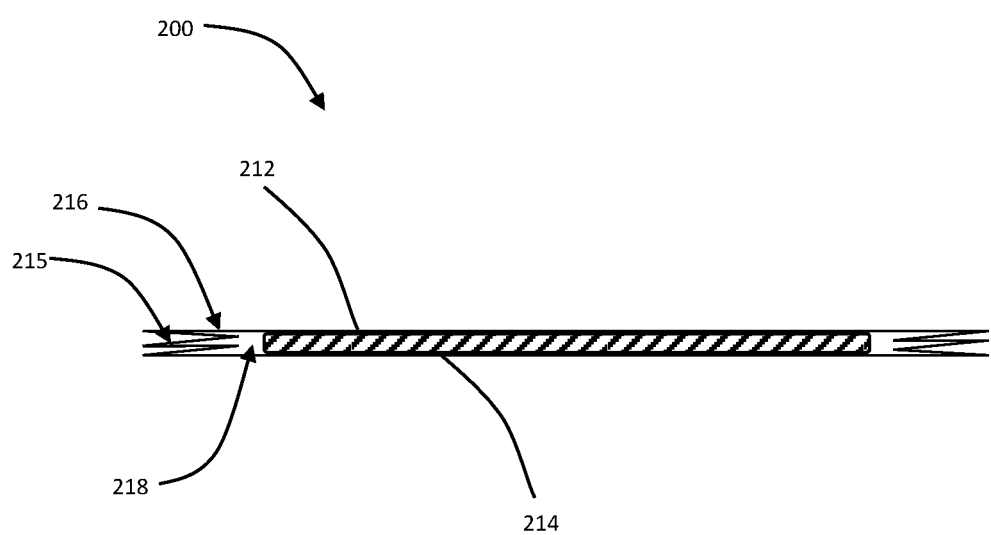
FIG. 27 is a schematic side cross-section view of a third alternative package for a food product.
Figure 28:
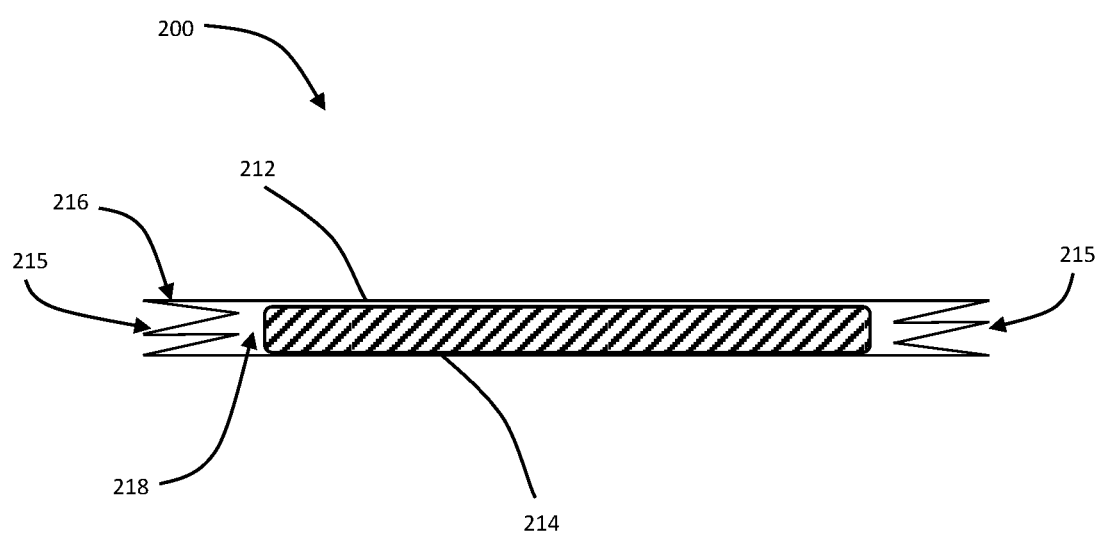
FIG. 28 is a schematic side cross-section view of the third alternative package for a food product in its expanded form.
Figure 29:
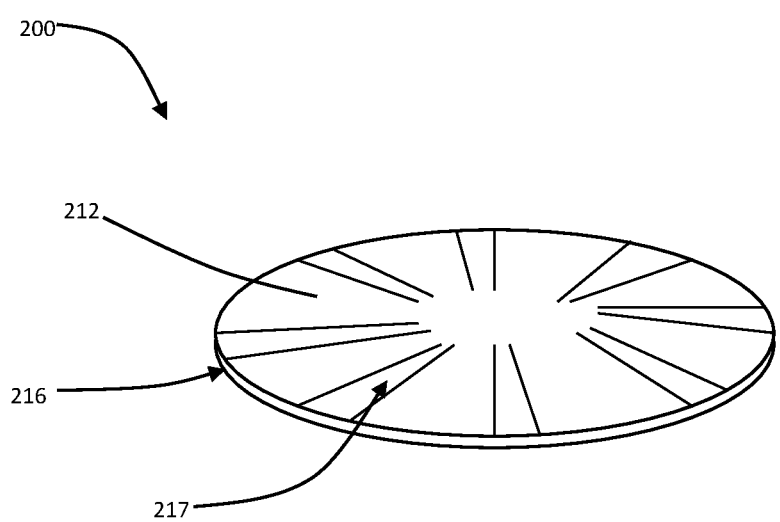
FIG. 29 is a top perspective view of a fourth alternative package for a food product.
Figure 30:
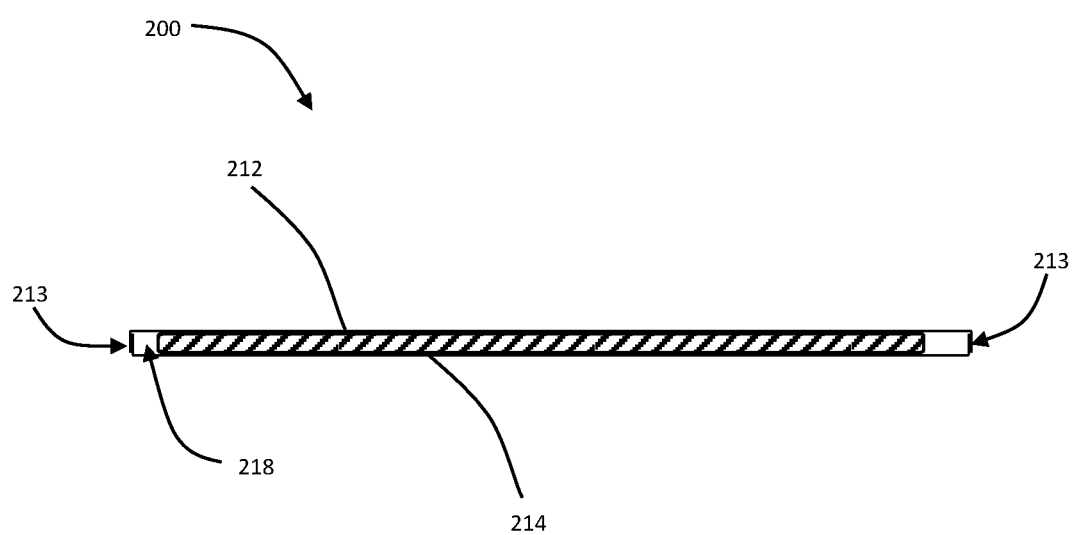
FIG. 30 is a schematic side cross-section view of a fourth alternative package for a food product.
Figure 31:
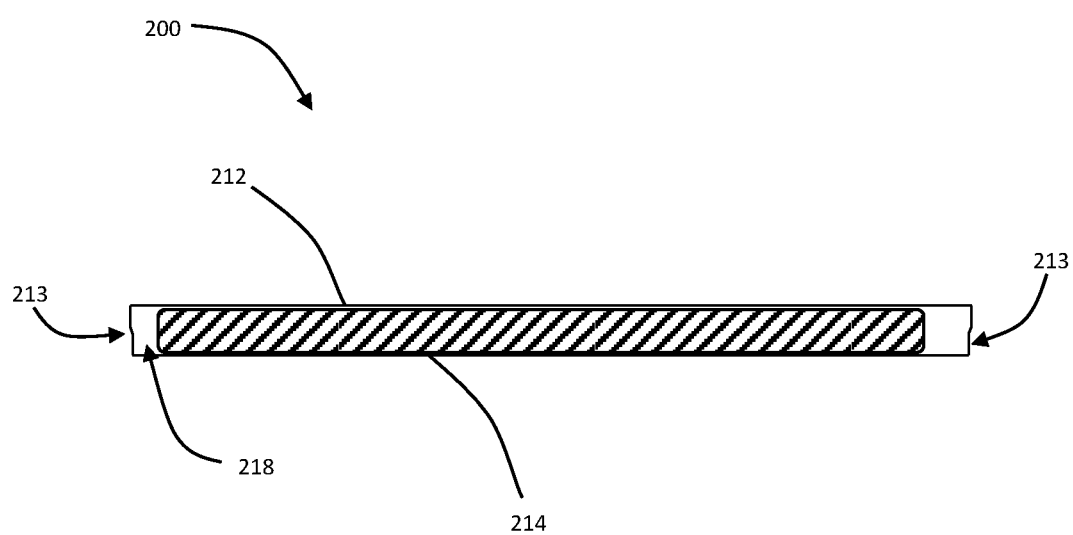
FIG. 31 is a schematic side cross-section view of the fourth alternative package for a food product in its expanded form.
Figure 32:
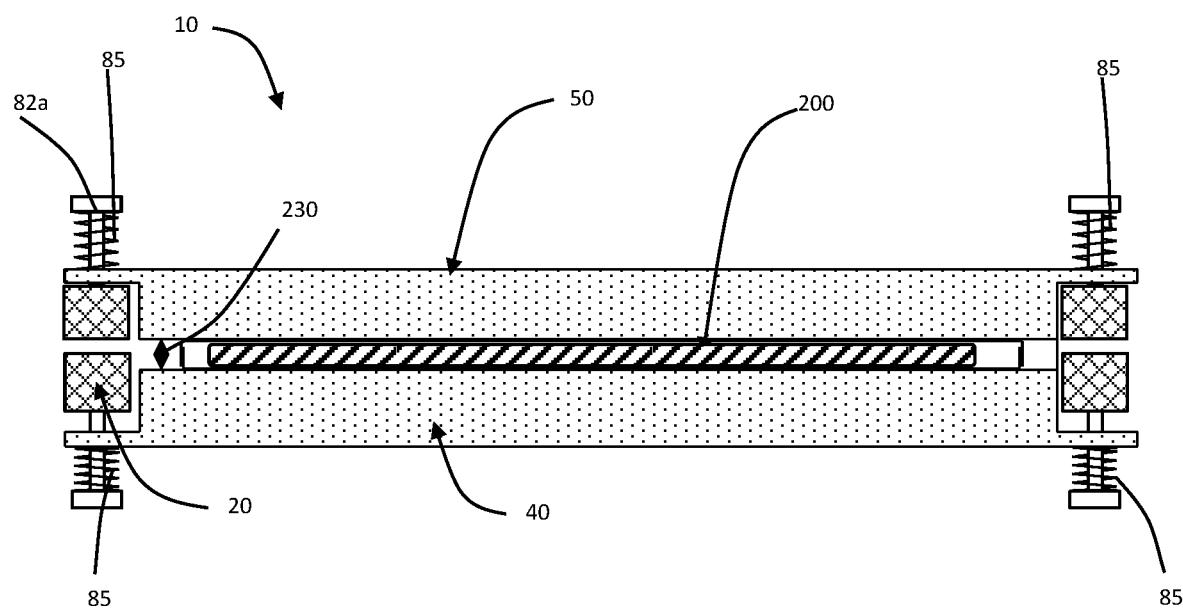
FIG. 32 is a schematic side cross-section view of a fourth embodiment of a cooking appliance with a food product in a first stage of the cooking process.
Figure 33:
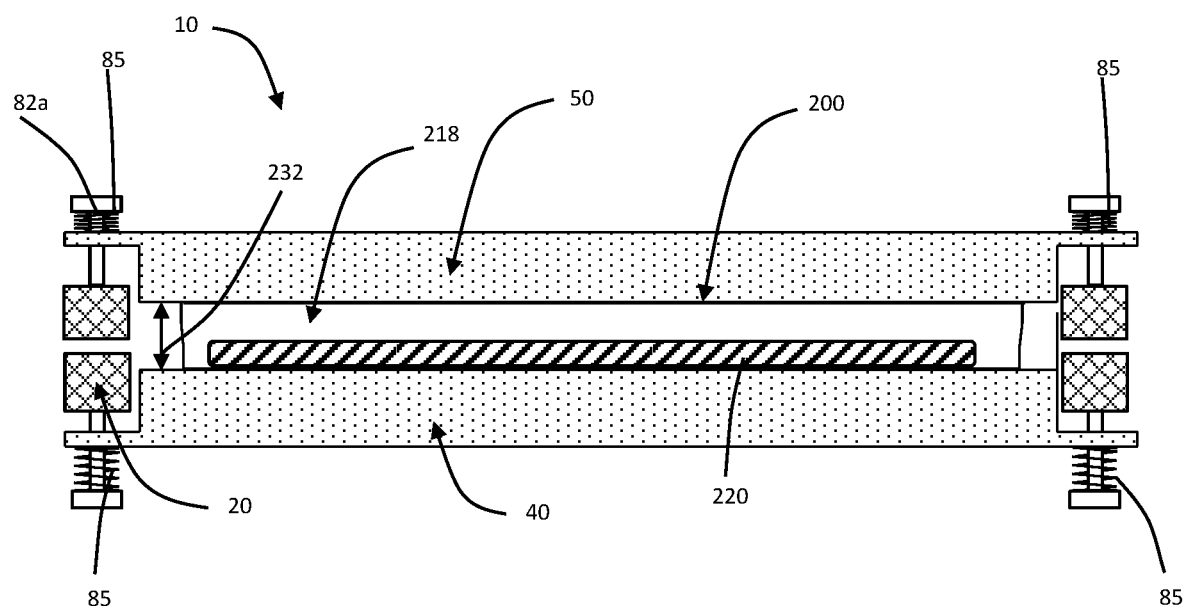
FIG. 33 is a schematic side cross-section view of a fourth embodiment of a cooking appliance with a food product in a second stage of the cooking process.
Figure 34:
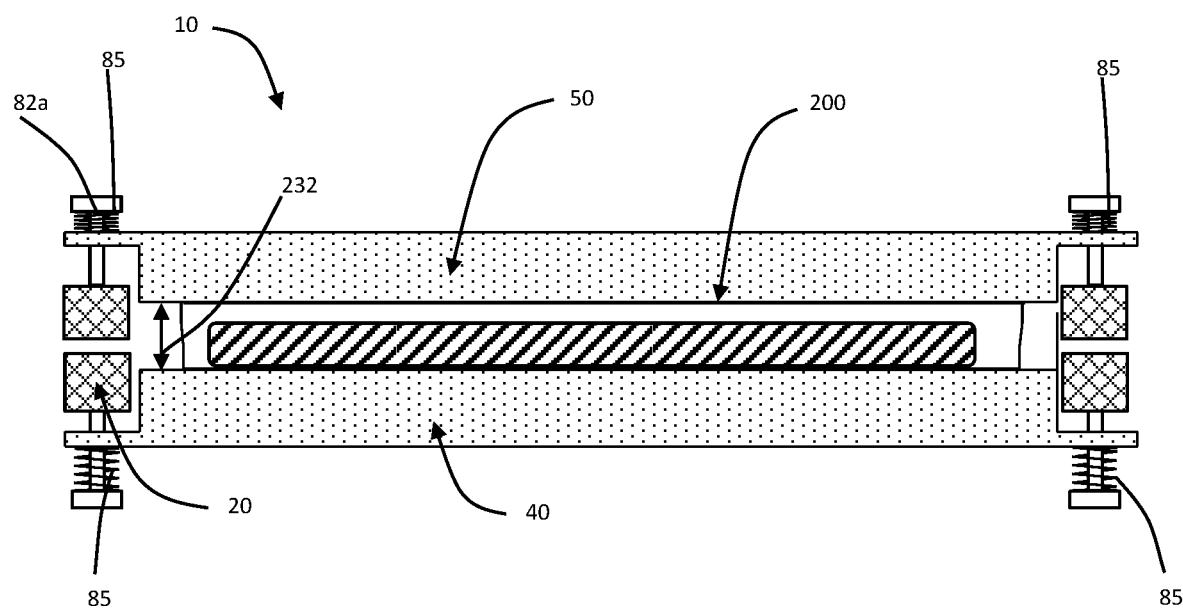
FIG. 34 is a schematic side cross-section view of a fourth embodiment of a cooking appliance with a food product in a second stage of the cooking process.
Figure 35:
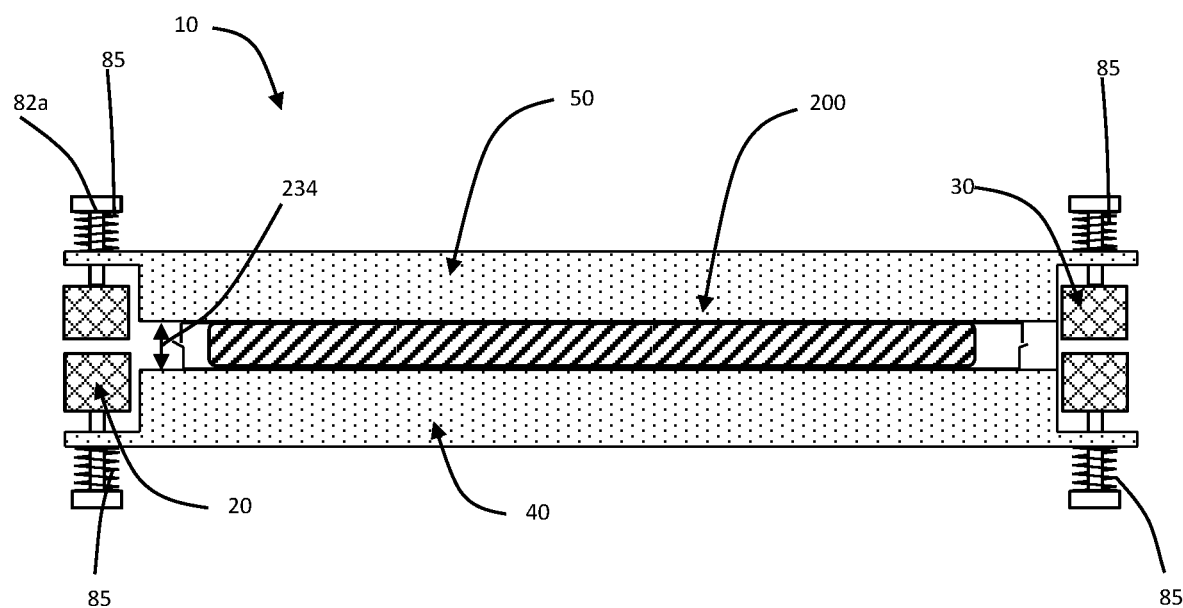
FIG. 35 is a schematic side cross-section view of a fourth embodiment of a cooking appliance with a food product in a third stage of the cooking process.

However, it is anticipated that the packaged food arrangement need not necessarily be cooked and/or baked by heated plates. In an alternative arrangement, it is envisaged that the outer package can include expansion formations including any one or more selected from concertina formations 215 (as shown in FIGS. 27 and 28), telescopic formations 213 (as shown in FIGS. 30-35), and pleat formations 217 (as shown in FIG. 29) that allow for expansion of the outer package due to the expansion of gases during the cooking and/or baking process. The cooking and/or baking process can be initiated by, for example baking in an oven by conventional convention and radiation from a heat source, irradiating the packaged food arrangement in a microwave oven, steaming, contact with a hot plate, or any other suitable means.

It is anticipated that the packaged food arrangement will preferably be configured in a substantially flat and planar configuration prior to the cooking and/or baking process. In this way, the package food arrangement can be conveniently stored in a freezer or fridge in an efficient manner. It is also anticipated that in a preferred embodiment, the package food arrangement will still be configured as a substantially planar configuration in its cooked state, but thicker.

It is further anticipated that the food product stored within the packaged food arrangement will be freezable.

The inventor has found that the internal chamber 218 and the gases produced and retained therein during the cooking process provide an optimum environment for the food product 220 to be cooked and produce a desired cooked product composition and texture.

In some specific food products 220, it has been found that minimising the release of the gases from the internal chamber 218 has been advantageous.

In other specific food products 220, it has been found that releasing the gases from the internal chamber 218 after a predetermined pressure within the internal chamber 218 is reached has been advantageous. During the cooking process, pressure within the internal chamber 218 increases as the food product 220 expands and produces more gases. For some food products 220, it has been found that releasing the gases after the pressure within the internal chamber 218 reaches about 1.5 bar (1.5 atm) is advantageous in producing the desired product texture.

Preferably, the package 210 includes a releasing arrangement or release means for releasing the gases when this predetermined pressure is reached. The release means can comprise a seal which opens at the predetermined pressure.

In other specific food products 220, it has been found that constantly releasing the gases from the internal chamber 218 at a slow predetermined rate has been advantageous. The release means can comprise at least one aperture of predetermined diameter formed in the package.

The retaining assembly 90 retains a minimum distance between the upper and lower plates 50 and 40 during the third stage of the cooking process which avoids the finished product being squashed down by the weight of the upper plate 50.

Figure 23:
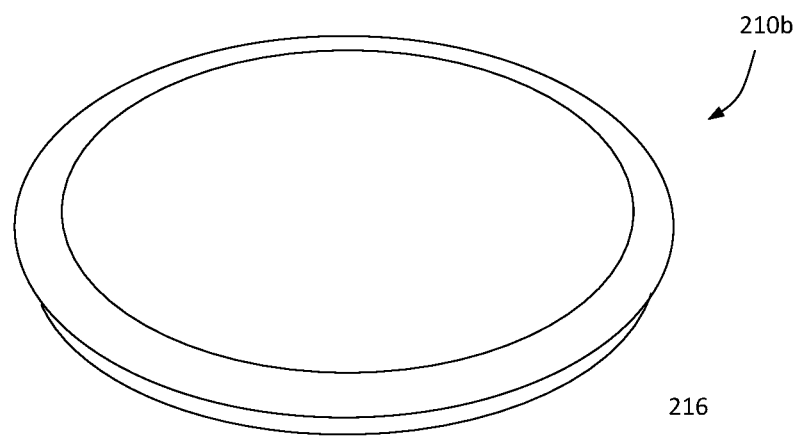
FIG. 23 is a schematic perspective view of a first alternative packaged batter based food product.
Figure 24:
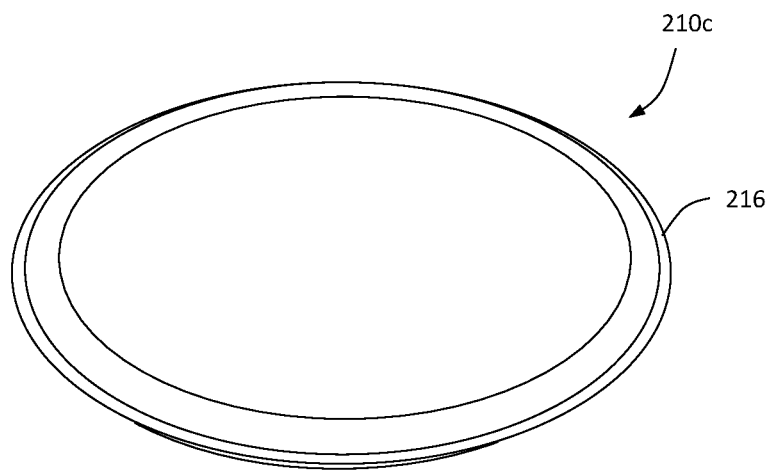
FIG. 24 is a schematic perspective view of a second alternative packaged batter based food product.

FIGS. 23 and 24 show two alternative packages 210b and 210c, which are both circular disc shaped, with the package 210b having rounded edges 216 with a minimal lip and the package 210c having flanged edges 216. It is apparent other possible shapes of the packages are possible, including those that form cavities, apertures, textures or shapes to the cooked batter mixture 220. The first and/or the second panels 212 and 214 can also be resiliently stretchable or expandable to allow for expansion of the package 210 and also allow textures or embossments to be formed in the cooked product.

FIG. 25 shows a first alternative package 210b for a food product. This embodiment comprises first and second spaced panels 212 and 214 and a side wall 215 connecting peripheral portions of the first and second panels 212 and 214 to form an internal chamber 218 therewithin. The at least one side wall 215 is stretchable or expandable to allow for expansion of the package when the food product therewithin produces gases during the cooking process.

FIG. 26 shows a second alternative package 210c for a food product which is similar to the package 210b. In this embodiment, the side wall 215 comprises a concertina structure to allow for expansion of the package.

The first and second spaced panels 212 and 214 comprise non-stick, heat resistant, food approved material, which allows the food product to be cooked via heated plate contact with the package.

In one embodiment, the panels 212 and 214 are made from baking paper, being silicon coated, non-stick, heat resistant paper. Other suitable food approved material can also be used, such as Teflon® coated material, and others which are heat resistant up to at least 220° C.

In use, the lid body 30 is initially in the open configuration as shown in FIG. 1 and the lower and upper plates 40 and 50 are heated. This also corresponds to the open configuration of the lower and upper plates 40 and 50. A packaged food product 200 is placed onto the top surface 42, and can be retained therein by the peripheral border 44 if it slips. The lid body 30 is then moved to its closed configuration, at which the lower and upper plates 40 and 50 move to their closed configuration and cook the packaged food product 200 along the three stages described above. Once cooked, the tab stopper 28 releases the lower plate 40 which allows the lid body 30 to move back to its open configuration.

Moving the lid body to its closed configuration can be done manually, at which the lid body 30 preferably includes a handle, or automatically via motor control. Preferably, the tab stopper is controlled by a cooking timer which automatically releases the lower plate 40 after the end of the predetermined cooking period. When the lower plate 40 moves back to its tilted position, the packaged food product 200 can be slid down the lower plate 40 to a plate positioned in front of the front wall 24. The cooked finished product 220 is then removed from the package 210 by peeling the panels 212 and 214 from each other. The panels 212 and 214 can include peel tabs to assist this action.

Alternatively, the cooked food product 220 can be retained in its package 210 which provides hygienic storage for eating of the food product 220 later. The package 210 can also be partially opened for use as a container at which a desired sauce can be added to the cooked food product 220.

The cooking appliance 10 is designed for domestic use and is thus sized to sit on top of domestic kitchen bench. The lower and upper plates 40 and 50 thus preferably have a maximum length and width of about 20 cm each. The cooking appliance 10 can have several individual pairs of lower and upper plates 40 and 50 laid side by side, with a common lid body 30 or separate lid bodies 30.

Alternatively, the cooking appliance can be sized for small commercial, or large commercial use and can include large size lower and upper plates or a large number of pairs of lower and upper plates.

The preferred embodiment thus provides a packaged food product which is cooked/baked in a package in a cooking appliance which positions the heated plates as required to cook the food product in a manner which provides the desired composition and finish. The package is heat resistant and allows the food product to be cooked via heated plate contact with the package. The appliance and the package can also be used for cooking other products, for example for frying items such as bacon and hamburgers. The present cooking appliance saves time and cooks a product on both sides simultaneously.

In the preferred embodiment, the food product is batter based which bubbles and expands under temperature.

The cooking appliance substantially maintains contact with the packaged food product throughout the three stages of cooking and assists in uniform cooking of the finished product. The retaining assembly 90 avoids full collapse of the upper plate 50 to the lower plate 40 thus maintaining a fluffy texture to the finished product 220. The gases produced within the package 210 assists in cushioning the batter mixture 220 from the upper plate 50, thus allowing the food product 220 to rise and cook within the internal chamber 218 with minimal pressure from the upper plate 50.

The present preferred embodiment thus allows household users to cook a packaged food product with minimal preparation, mess and cleaning.

Figure 10:
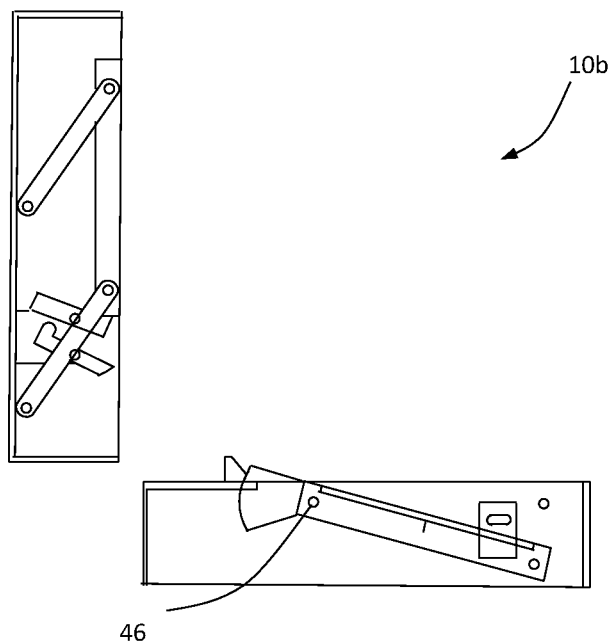
FIG. 10 is a schematic side cross-section view of a second embodiment of the cooking appliance in its fully open configuration.
Figure 11:
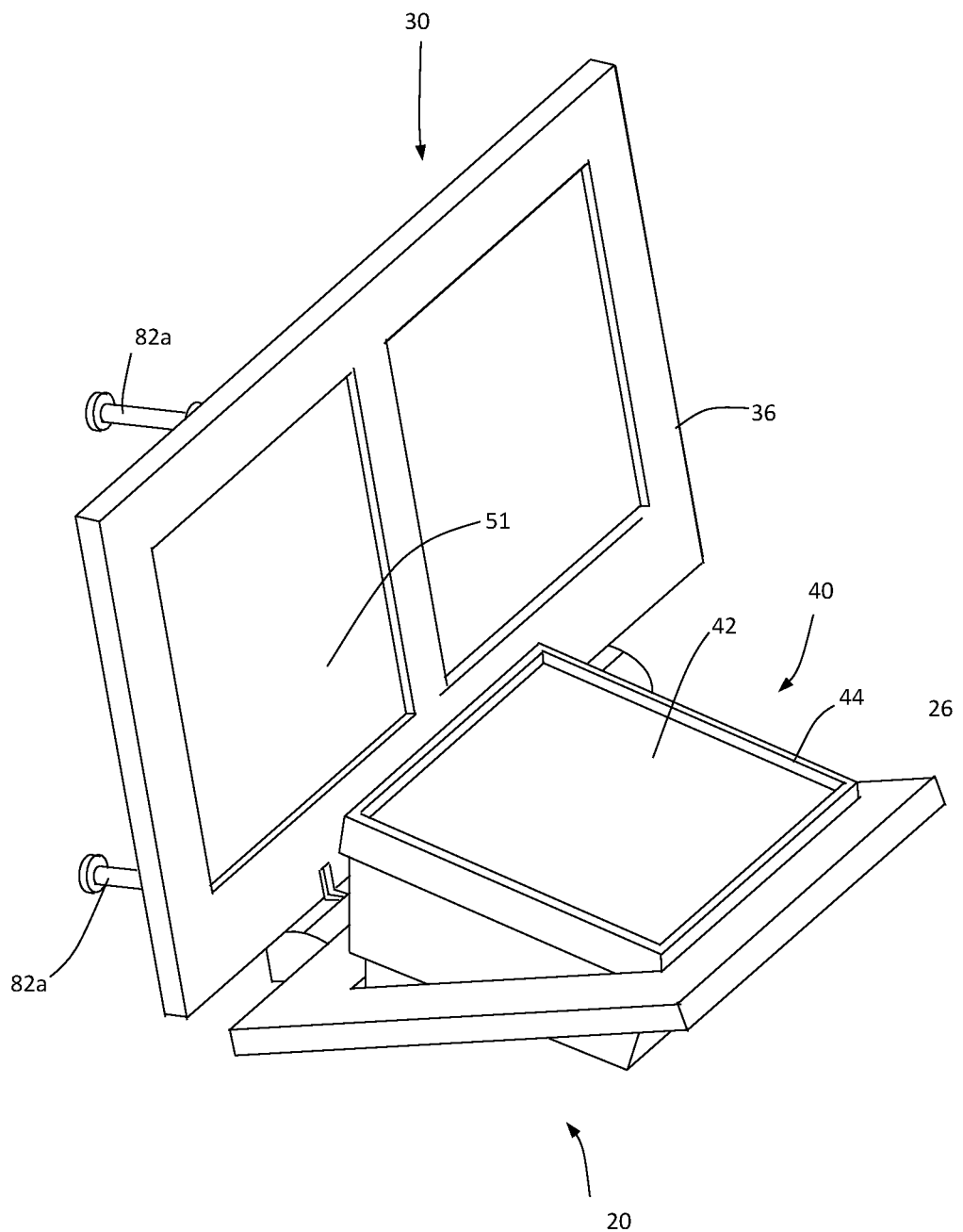
FIG. 11 is a schematic front perspective view of a cooking appliance in accordance with a third embodiment of the present invention in the open configuration.
Figure 12:
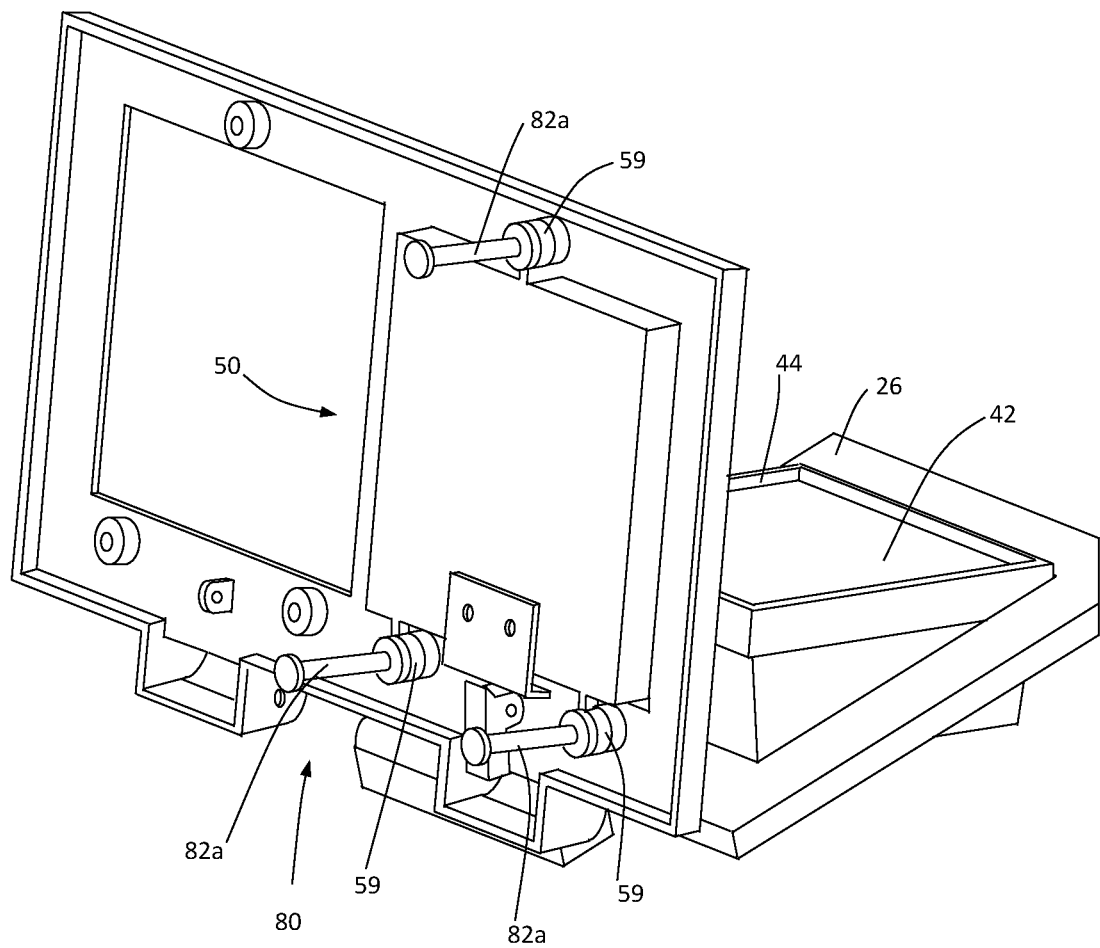
FIG. 12 is a schematic rear perspective view of the cooking appliance of FIG. 11 in the open configuration.
Figure 13:
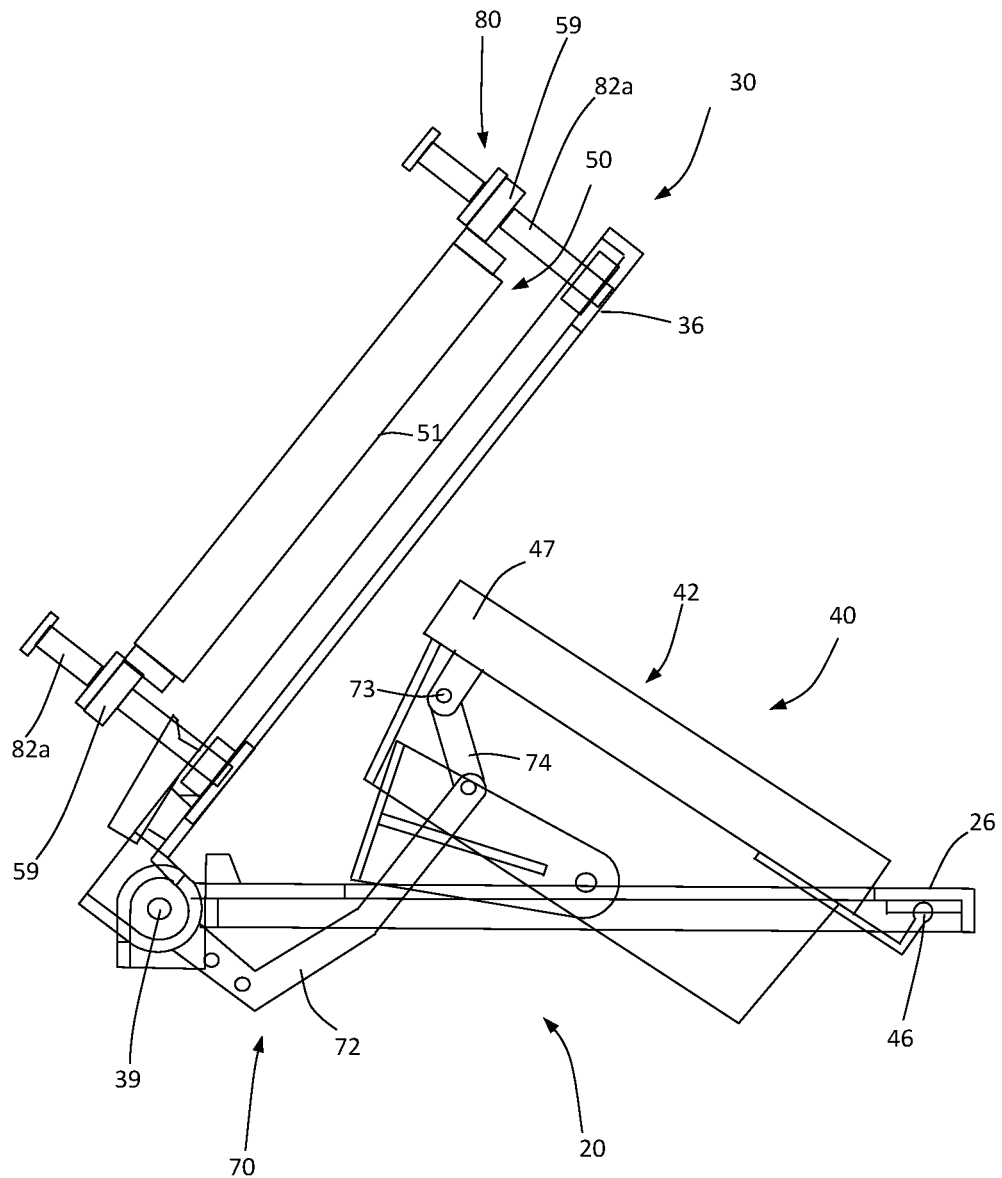
FIG. 13 is a schematic side cross-section view of the cooking appliance of FIG. 11 in the open configuration.
Figure 14:
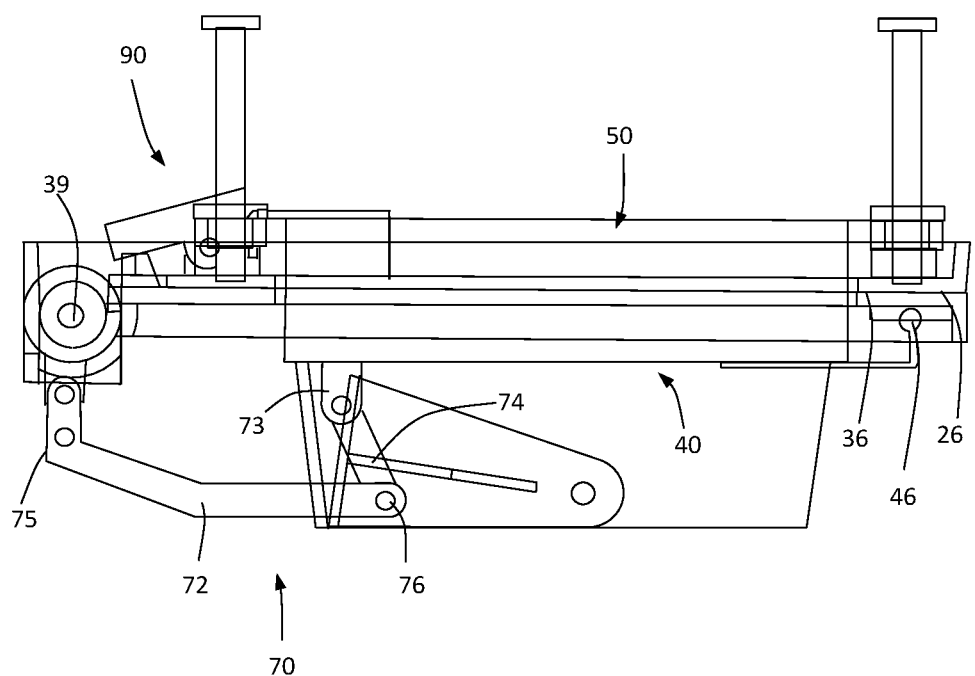
FIG. 14 is a schematic side cross-section view of the cooking appliance of FIG. 11 in the closed configuration with the cooking plates in a first relative position.
Figure 15:
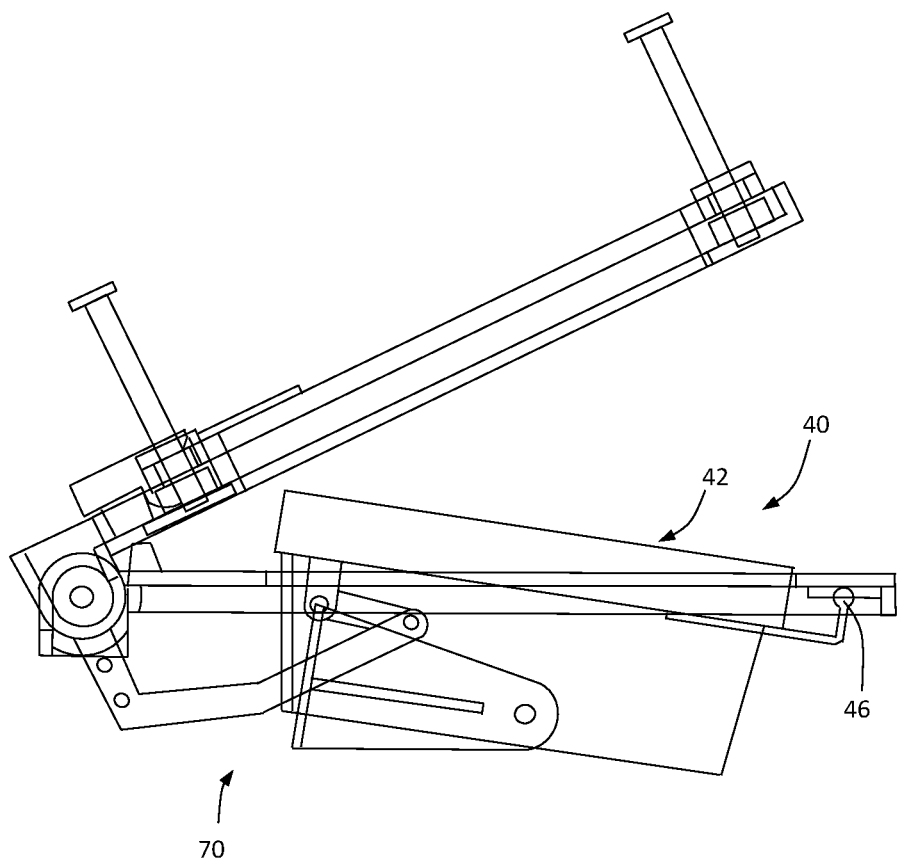
FIG. 15 is a schematic side cross-section view of the cooking appliance of FIG. 11 being moved back to the open configuration.

FIG. 10 shows a cooking appliance 10b which is a modified embodiment of the cooking appliance 10. In this embodiment, the lower plate 40 pivots about a rear pivot point [196] 46 and a front end of the lower plate 40 extends down towards the bottom wall 21 in the open configuration of the lid body 30. The front end of the lower plate 40 is then raised in the closed configuration of the lid body 30. The front wall 24 in this embodiment may have an opening or a cut-out portion to allow for the food product to slide down from the top surface 42.

FIGS. 11 to 15 show a third embodiment of a cooking appliance 10c. The cooking appliance 10c is similar to the cooking appliance 10 and similar parts are indicated with the similar reference numerals.

In the drawings, several portions of the base body 20 and the lid body 30 are omitted for illustration purposes. Only the portions of these parts having the base upper edge 26 and the lid lower edge 36 are shown. The lid body 30 is similarly pivotable relative to the base body 20 between an open configuration and a closed consideration.

The lower plate 40 similarly comprises a heatable top surface 42. The cooking appliance 10c also comprises the tilting assembly 70 for the lower plate 40. The upper plate 50 also comprises a heatable lower surface 51.

In this embodiment, the mounting mechanism 80 for the upper plate 50 comprises spaced posts 82a mounted to the lid body 30 and extending generally perpendicularly to the lid lower edge 36. The upper plate 50 comprises ring formations 59 respectively engaging and movable along the posts 82a to allow the upper plate 50 to move in a generally perpendicular (vertical) direction relative to the lid lower edge 36 in the closed configuration and minimises lateral movement.

The lid body 30 can also comprise a retaining assembly 90 which will retain the upper plate 50 at a predetermined distance from the lower plate 40 in the final stage of the cooking process, which can be of different configuration to the retaining assembly 90 above.

The first and second plates 40 and 50 in the above embodiments comprise flat heatable surfaces in the form of top surface 42 and lower surface 51.

Alternatively, at least one of the top surface 42 and lower surface 51 can be textured as desired, for example for cooking waffle products or producing embossments in the cooked product.

Whilst preferred embodiments of the present invention have been described, it will be apparent to skilled persons that other modifications can be made to the embodiments described.

For example, depending on the food product, the third stage of the cooking process may not be required and can be omitted. This can be used for example for cooking any unpackaged food product. Also, the retaining assembly can be disengaged if a flat finish to the food product is desired. The retaining assembly can also be modified such that the first, second and/or third relative distances between the plates are adjustable, and that the second relative distance can be up to a maximum selected distance.

The cooking appliance can also be modified to have both the upper and lower plates movable relative to each other. Also, the plates can be oriented to be substantially vertical instead of horizontal. The plates can alternatively be oriented at an inclined angle in the closed configuration.

The first and second plates are also substantially parallel to each other in the closed configuration. In another embodiment, the first and second plates can be at an acute angle to each other in the closed configuration, for producing wedge shaped cooked products.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the food and kitchen appliance industries.

I claim:

1. A cooking appliance for a packaged food arrangement, the cooking appliance comprising:
    a base body having a base bottom wall, base side walls, a base rear wall and a base front wall so as to form a base internal space with a peripheral base upper edge opposite said base bottom wall;
    a lid body having a lid top wall, lid side walls, a lid rear wall and a lid front wall so as to form a lid internal space with a peripheral lid lower edge opposite said lid top wall;
    a hinge extended along adjacent edge portions of said base rear wall and said lid rear wall, said lid body being pivotable relative to said base body at said hinge between a closed configuration and an opened configuration;
    a lower plate being disposed within said base internal space and having top heating surface facing said peripheral base upper edge;
    an upper plate being disposed within said lid internal space and having an upper plate heating surface facing said peripheral lid lower edge;
    a pair of front arms pivotably mounted to a front pivot portion of said upper plate and to a front upper portion of a respective lid side wall between said lid front wall and said lid rear wall;
    a pair of rear arms pivotably mounted to a rear pivot portion of said upper plate and to a rear upper portion of the respective lid side wall between said front upper portion and said lid rear wall, said upper plate being movable within said lid internal space between said lid top wall and said peripheral lid lower edge;
    wherein said upper plate within said lid internal space between said lid top wall and said peripheral lid lower edge sets said upper plate heating surface relative to said top heating surface; and
    a retaining assembly being comprised of:
        an angle formation member being mounted to said base body, extending upwardly from said peripheral base upper edge, and having an inclined angle surface facing said lid body;
        a pivot block extending from said lid body;
        an actuation arm being pivotally mounted to said pivot block at an actuation arm pivot point and being comprised of an angled lower end and an upper stub disposed on opposite sides of said actuation arm pivot point; and
        a retaining arm being pivotally mounted to said pivot block at a retaining arm pivot point and being comprised of an upper portion and a lower retaining leg disposed on opposite sides of said retaining arm pivot point, wherein said lower retaining leg engages a rear edge of said upper plate so as to set said upper plate between said lid top wall and said peripheral lid lower edge, wherein said lower retaining leg engages a rear wall of said upper plate so as to set said upper plate with said upper plate heating surface along said peripheral lid lower edge, and wherein said lower retaining leg is positioned below said upper plate so as to set said upper plate heating surface between said lid top wall and said lower retaining leg.

2. The cooking appliance as claimed in claim 1, wherein said lower retaining leg engages a rear wall of said upper plate and said upper stub of said actuation arm engages said upper portion of said retaining arm so as to set said upper plate with said upper plate heating surface along said peripheral lid lower edge.

3. The cooking appliance as claimed in claim 1, wherein said lower angled end of said actuation arm engages said angle formation member so as to pivot said actuation arm away from said upper portion of said retaining arm at said actuation arm pivot point.

4. The cooking appliance as claimed in claim 1, further comprising a torsion spring mounted on said hinge so as to maintain a compressive force between said upper plate heating surface and said top heating surface.

5. The cooking appliance as claimed in claim 1, wherein said lower plate is further comprised of a peripheral border around said top heating surface, said top heating surface being recessed from said peripheral base upper edge by said peripheral border.

6. The cooking appliance as claimed claim 1, further comprising:
   a tilting assembly being connected to said lid body and said base body and being comprised of:
      a bent rigid arm having a first end attached to said lid body and a second distal end opposite said first end;
      a post extending downward from said lower plate; and
      a link pivotably attached to said second end and pivotably attached to said post so as to lift said lower plate when said lid body is in said opened configuration.

7. The cooking appliance as claimed in claim 6, wherein said lower plate is pivotally attached to said base body at a front pivot portion, further comprising:
   another torsion spring mounted on said front pivot portion so as to resilient bias said lid body in said opened configuration through said tilting assembly.

8. The cooking appliance as claimed in claim 6, further comprising:
   a tab stopper connected to said base body within said base internal space so as to engage said lower plate when said lid body is in said closed configuration.

* * * * *